United States Patent
Matsuzaki et al.

(10) Patent No.: US 9,467,439 B2
(45) Date of Patent: Oct. 11, 2016

(54) ACCESS CONTROL METHOD, ACCESS CONTROL SYSTEM, COMMUNICATION TERMINAL, AND SERVER

(71) Applicant: Panasonic Intellectual Property Corporation of America, Torrance, CA (US)

(72) Inventors: Natsume Matsuzaki, Osaka (JP); Yuichi Futa, Ishikawa (JP); Hideki Matsushima, Osaka (JP); Manabu Maeda, Osaka (JP); Yuji Unagami, Osaka (JP); Tomoyuki Haga, Nara (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 363 days.

(21) Appl. No.: 14/024,809

(22) Filed: Sep. 12, 2013

(65) Prior Publication Data

US 2014/0082716 A1 Mar. 20, 2014

(30) Foreign Application Priority Data

Sep. 19, 2012 (JP) .................................. 2012-206177
Sep. 5, 2013 (JP) .................................. 2013-184489

(51) Int. Cl.
H04L 29/00 (2006.01)
H04L 29/06 (2006.01)
H04L 29/08 (2006.01)

(52) U.S. Cl.
CPC ........... *H04L 63/0815* (2013.01); *H04L 67/04* (2013.01); *H04L 67/22* (2013.01)

(58) Field of Classification Search
CPC .... H04L 63/0815; H04L 67/22; H04L 67/04
See application file for complete search history.

(56) References Cited

U.S. PATENT DOCUMENTS

| | | | | |
|---|---|---|---|---|
| 2001/0049846 A1* | 12/2001 | Guzzi | ..................... | D06F 33/02 8/158 |
| 2002/0040505 A1* | 4/2002 | Tanaka | ................... | D06F 39/005 8/158 |
| 2002/0120502 A1* | 8/2002 | Sakaguchi | ............. | G06Q 30/02 705/14.49 |
| 2003/0131156 A1* | 7/2003 | Aizu | ....................... | H04B 3/54 710/1 |
| 2004/0006518 A1* | 1/2004 | Takahashi | .......... | G06Q 30/0601 705/26.1 |
| 2004/0111326 A1* | 6/2004 | Rock, Jr. | .............. | G06Q 10/087 705/26.8 |
| 2004/0162884 A1* | 8/2004 | Jeon | ........................ | H04L 12/24 709/208 |
| 2004/0186596 A1* | 9/2004 | Roh | ........................ | F25D 29/00 700/19 |

(Continued)

FOREIGN PATENT DOCUMENTS

| | | |
|---|---|---|
| JP | 1-161457 | 6/1989 |
| JP | 2002-366572 | 12/2002 |

(Continued)

*Primary Examiner* — Michael Pyzocha
(74) *Attorney, Agent, or Firm* — Wenderoth, Lind & Ponack, L.L.P.

(57) ABSTRACT

An access control method including: receiving a log information item indicating use history of electrical equipment that is used together with an intended product; receiving product information including information for identifying the intended product; storing the log information item received in the receiving of a log information item and the product information received in the receiving of product information, in association with each other; and controlling whether or not to allow access to the log information item based on the product information associated with the log information item when access to the log information item is attempted.

16 Claims, 21 Drawing Sheets

(56) References Cited

U.S. PATENT DOCUMENTS

| | | | |
|---|---|---|---|
| 2005/0044180 A1* | 2/2005 | Lamers | G06F 21/35 709/218 |
| 2005/0086061 A1 | 4/2005 | Holtmanns et al. | |
| 2007/0011195 A1* | 1/2007 | Kutsumi | G06Q 30/02 |
| 2007/0168200 A1* | 7/2007 | Shimizu | G06Q 30/02 700/90 |
| 2008/0282182 A1* | 11/2008 | Oosaka | H04L 12/2803 715/772 |
| 2009/0006970 A1* | 1/2009 | Jeffery | D06F 33/02 715/733 |
| 2009/0103836 A1* | 4/2009 | Shimizu | A61B 1/00059 382/305 |
| 2009/0287535 A1* | 11/2009 | Jennings | G06Q 20/20 705/16 |
| 2010/0031324 A1* | 2/2010 | Strich | G06F 21/10 726/4 |
| 2010/0125364 A1* | 5/2010 | Ebrom | D06F 33/02 700/275 |
| 2010/0250440 A1* | 9/2010 | Wang | G06Q 10/06 705/63 |
| 2010/0287059 A1* | 11/2010 | McCoy | D06F 39/005 705/26.5 |
| 2011/0032072 A1* | 2/2011 | Han | H04L 12/2827 340/5.1 |
| 2011/0148651 A1* | 6/2011 | Hendrickson | D06F 39/02 340/686.6 |
| 2011/0202411 A1* | 8/2011 | Nakai | G06Q 30/02 705/14.73 |
| 2011/0270453 A1* | 11/2011 | Kalogridis | H02J 3/14 700/291 |
| 2012/0019674 A1* | 1/2012 | Ohnishi | G08C 17/00 348/207.1 |
| 2012/0059735 A1* | 3/2012 | Su | G06Q 30/0631 705/26.7 |
| 2012/0074214 A1* | 3/2012 | Mizumoto | G01N 35/00732 235/375 |
| 2012/0102334 A1* | 4/2012 | O'Loughlin | G06F 21/57 713/189 |
| 2012/0116923 A1* | 5/2012 | Irving | G06Q 30/0641 705/27.1 |
| 2012/0164944 A1* | 6/2012 | Yamaoka | G06K 7/10198 455/41.1 |
| 2012/0179547 A1* | 7/2012 | Besore | G06Q 30/0261 705/14.58 |
| 2012/0190386 A1* | 7/2012 | Anderson | G01C 15/04 455/456.3 |
| 2012/0316984 A1* | 12/2012 | Glassman | G06Q 50/06 705/26.7 |
| 2013/0073690 A1* | 3/2013 | DeSalvo | H04L 67/12 709/219 |
| 2013/0087610 A1* | 4/2013 | Shin | G06Q 10/08 235/375 |
| 2013/0185079 A1* | 7/2013 | Park | D06F 33/02 704/275 |
| 2013/0185363 A1* | 7/2013 | DeLuca | H04L 51/16 709/206 |
| 2013/0247117 A1* | 9/2013 | Yamada | G08C 17/02 725/93 |
| 2013/0346300 A1* | 12/2013 | Kang | G05B 15/02 705/39 |
| 2014/0085056 A1* | 3/2014 | Kong | H04L 12/2827 340/10.51 |
| 2014/0156081 A1* | 6/2014 | Ha | D06F 33/02 700/275 |

FOREIGN PATENT DOCUMENTS

| | | |
|---|---|---|
| JP | 2005-506642 | 3/2005 |
| WO | 03/036900 | 5/2003 |

* cited by examiner

FIG. 7

| | | /701 |
|---|---|---|
| Accessing user | Access to raw data | Access to statistical data |
| Company B | Allow | Allow |
| Company C | — | Allow |
| Company D | — | Allow |

FIG. 8

| | | /801 |
|---|---|---|
| Accessing user | Access to raw data | Access to statistical data |
| Company F | Deny | Deny |
| Company G | Deny | — |
| Company H | Deny | — |

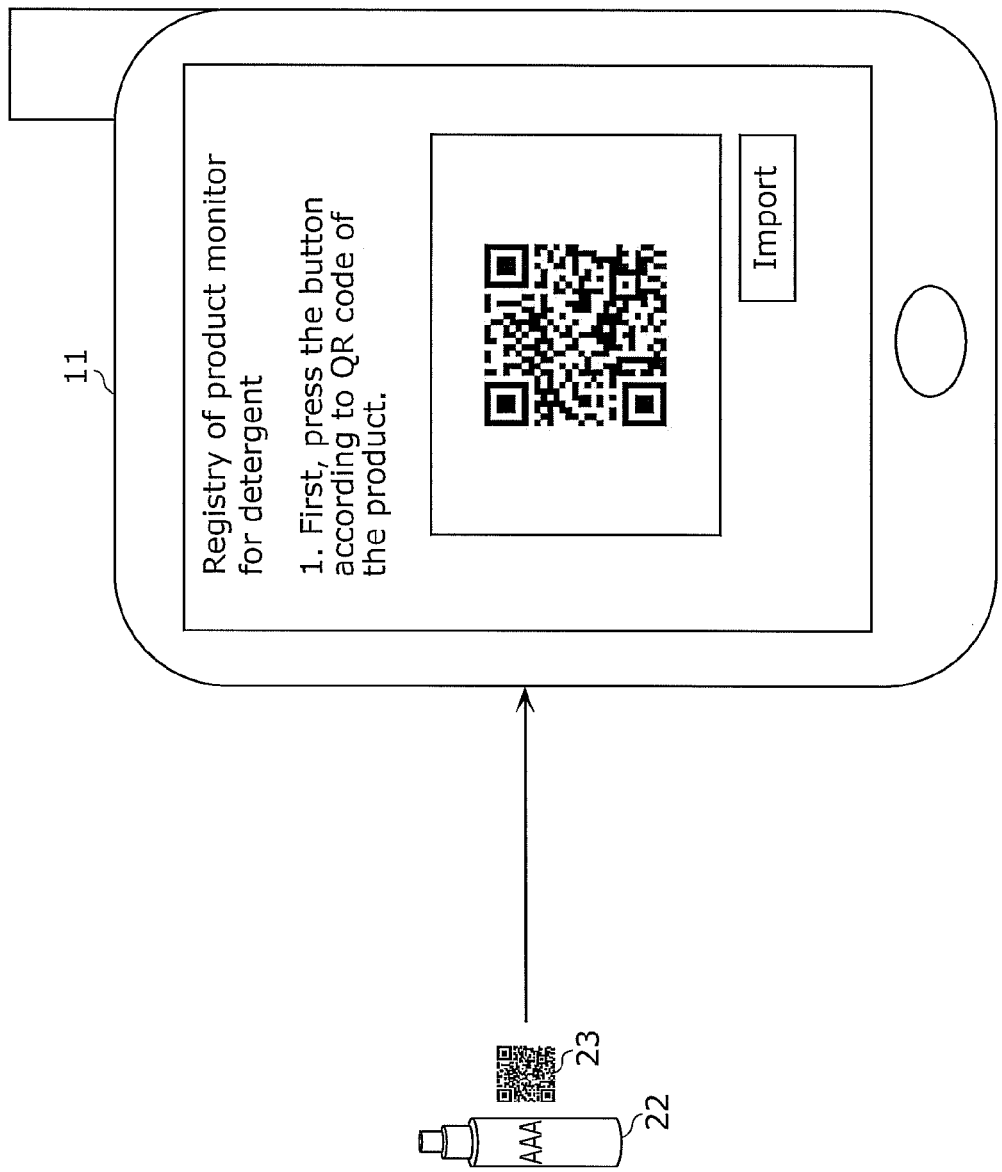

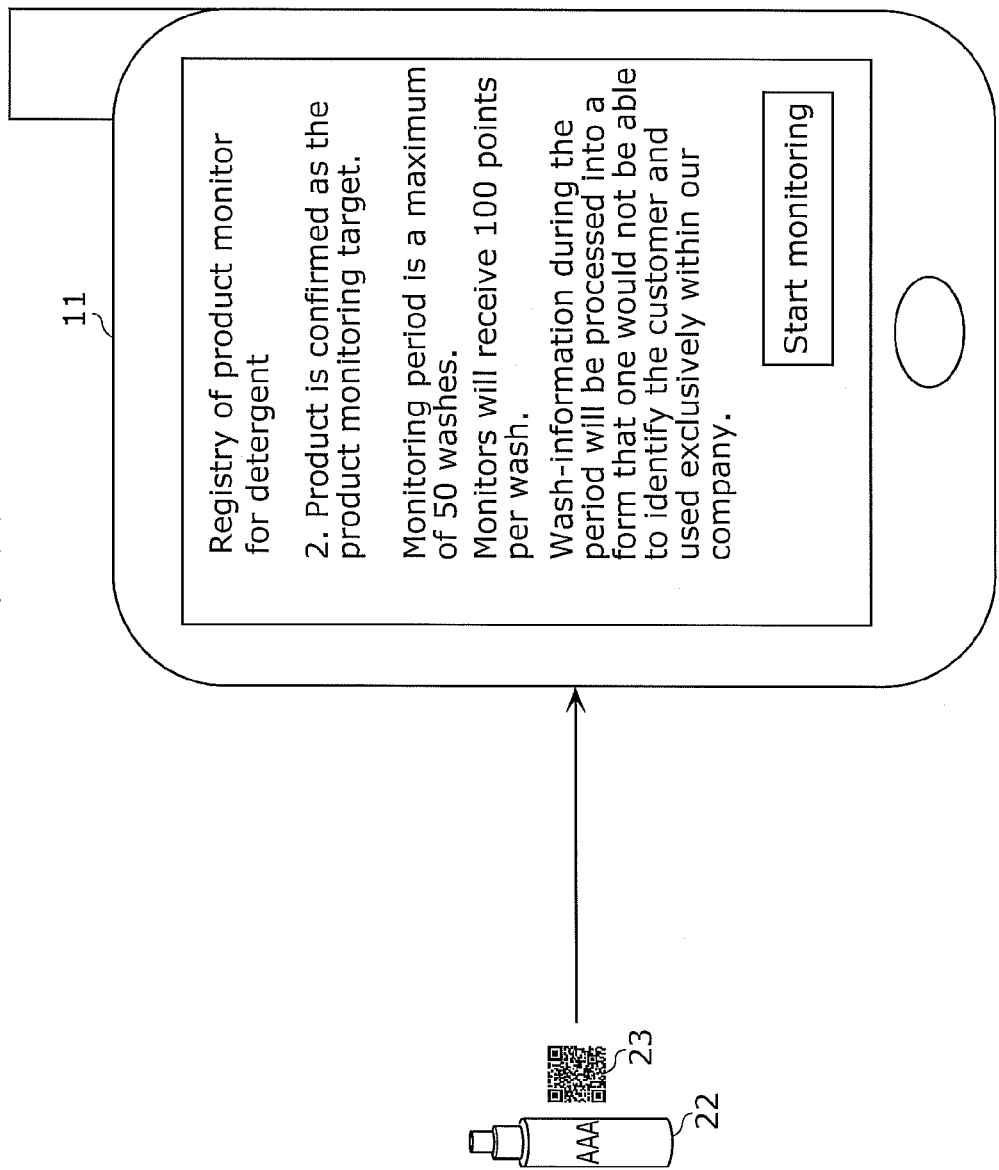

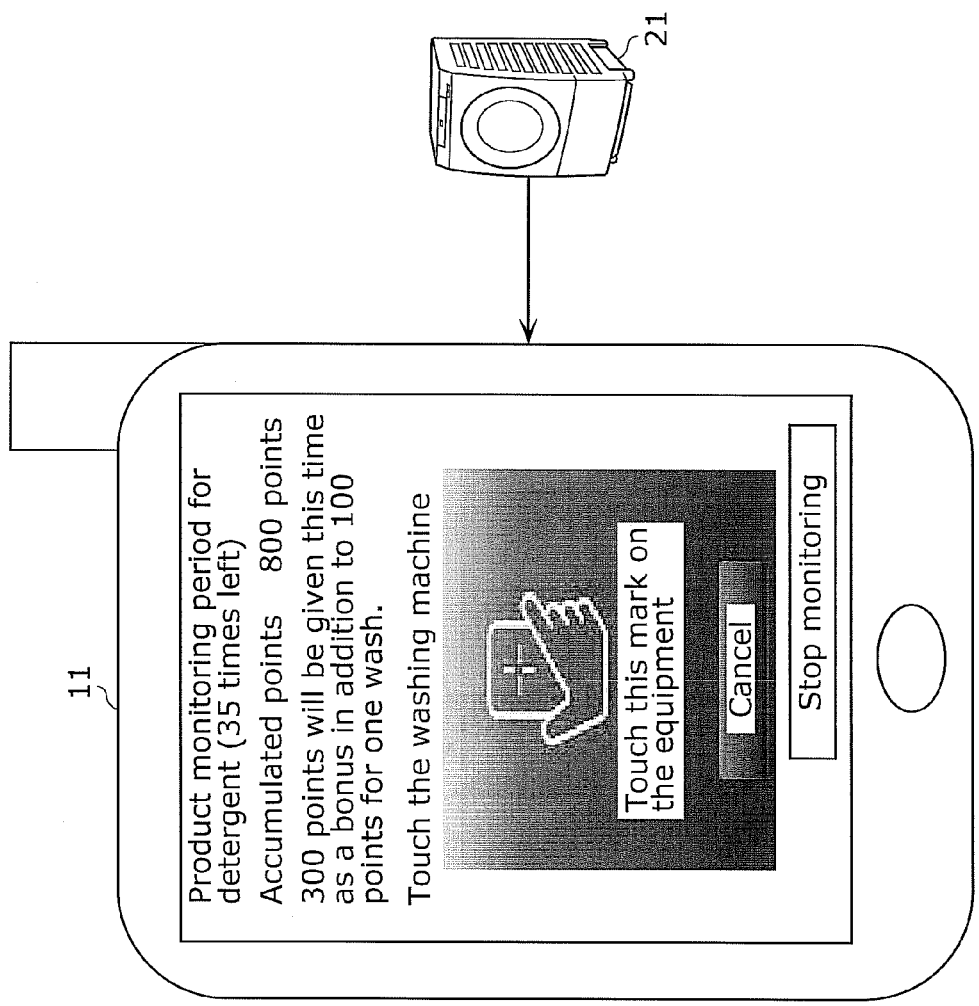

FIG. 10A

| Target equipment | Microwave oven |
|---|---|
| Provider | Company E |

| Time | 5 minutes |
|---|---|
| Output power | 600 W |
| Cooking succeed | Yes |

| Target equipment | Rice cooker |
|---|---|
| Provider | Company R |

| Type of rice | White rice |
|---|---|
| How to cook | Mixed |
| Amount of water | 61 % |
| Cooking succeed | Yes |

1102

ACCESS CONTROL METHOD, ACCESS CONTROL SYSTEM, COMMUNICATION TERMINAL, AND SERVER

CROSS REFERENCE TO RELATED APPLICATIONS

The present application is based on and claims priorities of Japanese Patent Application No. 2012-206177 filed on Sep. 19, 2012, and Japanese Patent Application No. 2013-184489 filed on Sep. 5, 2013. The entire disclosure of the above-identified application, including the specification, drawings and claims is incorporated herein by reference in its entirety.

FIELD

One or more exemplary embodiments disclosed herein relate to an access control method, an access control system, a communication terminal, and a server.

BACKGROUND

A technique is conventionally disclosed by which personal information is managed in a server, a user who provides the personal information registers a category of a referrer who can access the personal information, and access to the personal information by a referrer is controlled based on the category (for example, Patent Literature 1).

In addition, a technique is disclosed by which personal information is managed in a server, and when a referrer accesses the personal information, a user who provides the personal information is notified of access control to the server and information on a destination of the access (for example, Patent Literature 2).

Furthermore, a technique which distinctively provides a temporal referrer and a permanent referrer with the access privilege for a database of different types (for example, Patent Literature 3).

CITATION LIST

Patent Literature

[Patent Literature 1] Japanese Unexamined Patent Application Publication No. 2002-366572
[Patent Literature 2] Japanese Unexamined Patent Application Publication (Translation of PCT Application) No. 2005-506642
[Patent Literature 3] Japanese Unexamined Patent Application Publication No. 01-161457

SUMMARY

Technical Problem

However, there is a problem, when electrical equipment is used together with an intended product, that proper access control for information related to the usage of the electrical equipment when the intended product is used cannot be provided.

In view of the above, one non-limiting and exemplary embodiment provides an access control method for performing proper access control for information related to the usage of electrical equipment when an intended product is used.

Solution to Problem

In one general aspect, the techniques disclosed here feature an access control method including: receiving a log information item indicating use history of electrical equipment that is used together with an intended product; receiving product information including information for identifying the intended product; storing the log information item and the product information in association with each other, the log information item being received in the receiving of a log information item, the product information being received in the receiving of product information; and controlling whether or not to allow access to the log information item based on the product information associated with the log information item when access to the log information item is attempted.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

An access control method according to one or more exemplary embodiments or features disclosed herein provide proper access control for information related to the usage when electrical equipment is used together with an intended product.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 illustrates another example of a rule according to Embodiment 1.

FIG. 8 illustrates yet another example of a rule according to Embodiment 1.

FIG. 9B is a diagram illustrating a first example of a display image of a communication terminal used in the access control system according to Embodiment 1.

FIG. 9C is a diagram illustrating a second example of a display image of a communication terminal used in the access control system according to Embodiment 1.

FIG. 9D is a diagram illustrating a third example of a display image of a communication terminal used in the access control system according to Embodiment 1.

FIG. 10A illustrates an example of product information according to Modification 1 of Embodiment 1.

FIG. 10B illustrates an example of a log of electrical equipment according to Modification 1 of Embodiment 1.

FIG. 11A illustrates an example of product information according to Modification 2 of Embodiment 1.

FIG. 11B illustrates an example of a log of electrical equipment according to Modification 2 of Embodiment 1.

Figure 1:
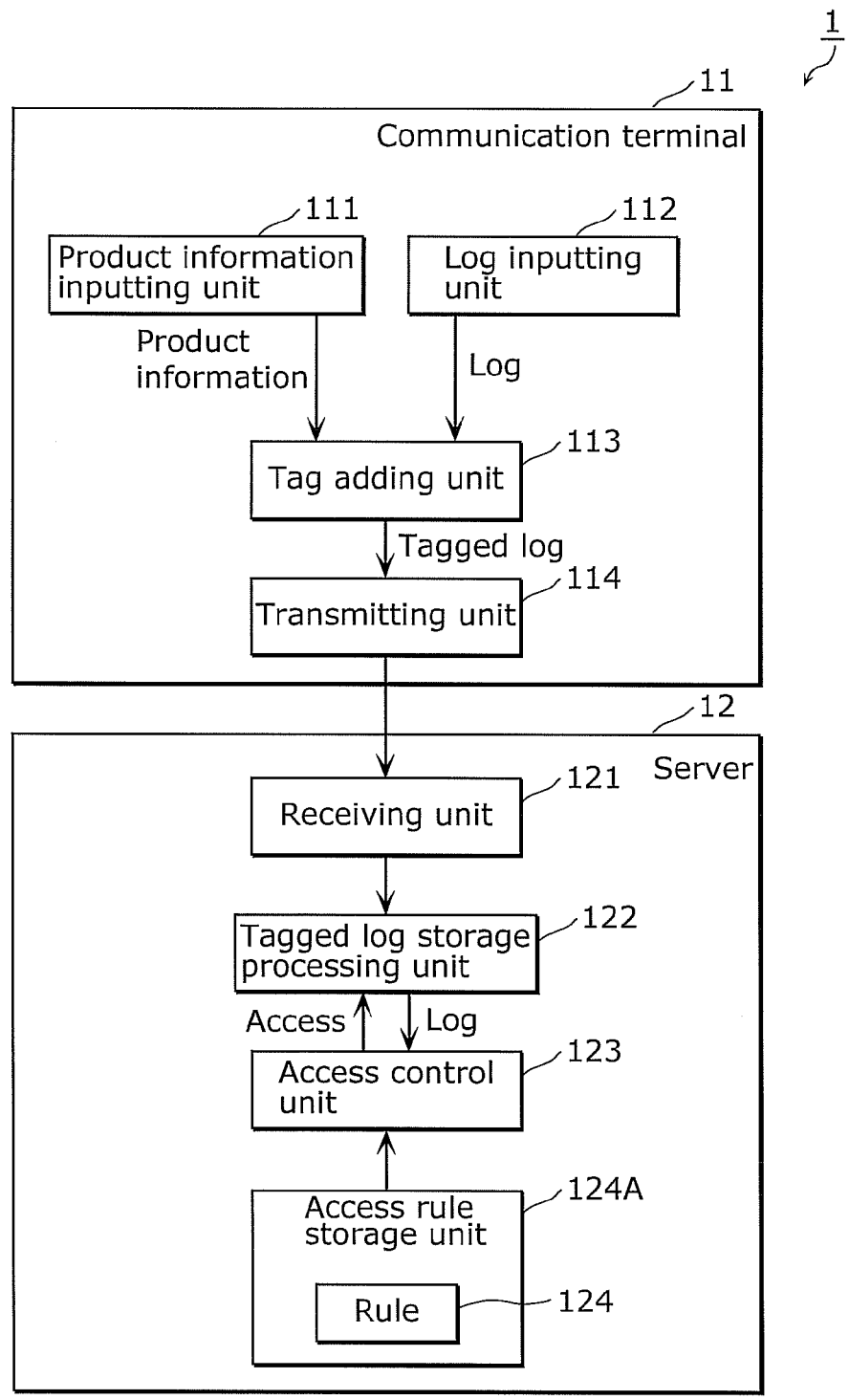
FIG. 1 is a block diagram illustrating an access control system according to Embodiment 1.

DESCRIPTION OF EMBODIMENTS (Underlying Knowledge Forming Basis of the Present Disclosure)

In relation to the access control techniques disclosed in the Background section, the inventors have found the problem described below.

Conventionally, electrical equipment is often used with an intended product. For example, laundry detergent or fabric softener which is used together with a washing machine is the intended product for the washing machine that is the electrical equipment. In addition, for a microwave oven that is the electrical equipment, cooking ingredient for microwave cooking such as retort food which is cooked in the microwave oven is the intended product. In addition, for facial equipment that is the electrical equipment, a cosmetic that is used at the same time when using the facial equipment by placing the facial equipment onto skin is the intended product.

In general, electrical equipment has a function of outputting and accumulating, upon each use, a log (log information item) that is information related to information on settings when used or a result of use. A maintenance personnel of the electrical equipment can get information related to how the electrical equipment was used, use frequency, or information related to breakdown, by analyzing the log. In addition, the maintenance personnel of the electrical equipment can identify the cause of the breakdown by utilizing the information obtained as described above, or obtain information for developing new electrical equipment.

On the other hand, as to the intended product used together with the electrical equipment, information on how the intended product was used is hardly obtained. As a result, a provider of the intended product cannot obtain the information on how a user used the intended product, in most cases. In particular, when a product developer developed a product that is used according to a usage different from a conventional usage, the developer hopes to obtain information on how a user of the product used the product. However, it is difficult to obtain the information.

In view of the above, a technique can be considered by which information related to how an intended product was used is obtained from a log of electrical equipment by adding information related to an intended product used together with the electrical equipment into the log of the electrical equipment. However, the information related to how an intended product was used is useful information not only for a provider of the intended product but also for other companies in the same trade or competing businesses. For that reason, access control is necessary which restricts people who can access the information to a certain range. The following describes in detail using a washing machine as an example of the electrical equipment and laundry detergent as an example of the intended product. When information related to how the laundry detergent was used such as the used amount of the laundry detergent, the settings for the washing machine when using the laundry detergent (the amount of time of wash, the number of times of rinsing, and so on), and the like, is to be obtained, the information might be obtained from the log of the washing machine. The information related to how the laundry detergent was used is useful for the manufacturer of the laundry detergent as well as for a competing laundry detergent manufacturer. In this case, access control is required which allows the manufacturer of the laundry detergent to access the information related to how the laundry detergent was used and prevents a competing detergent manufacture from accessing the information.

Conventionally, a technique is disclosed by which personal information is managed in a server, a user who provides the personal information registers a category of a referrer who can access the personal information, and access to the personal information by a referrer is controlled based on the category (for example, Patent Literature 1).

In addition, a technique is disclosed by which personal information is managed in a server, and a user who provides the personal information is notified of access control to the server and information on a destination of the access when a referrer accesses the personal information (for example, Patent Literature 2).

Furthermore, a technique which distinctively provides a temporary referrer and a permanent referrer with the access privilege for a database of different types (for example, Patent Literature 3).

However, there is a problem, when electrical equipment is used together with an intended product, that proper access control for information related to the usage of the electrical equipment when the intended product is used cannot be provided.

This problem can be solved by none of the techniques disclosed by the above-described Patent Literatures 1 to 3.

In view of the above, one non-limiting and exemplary embodiment provides an access control method for performing proper access control for information related to the usage of electrical equipment when an intended product is used.

According to an exemplary embodiment disclosed herein, an access control method includes: receiving a log information item indicating use history of electrical equipment that is used together with an intended product; receiving product information including information for identifying the intended product; storing the log information item and the product information in association with each other, the log information item being received in the receiving of a log information item, the product information being received in the receiving of product information; and controlling whether or not to allow access to the log information item based on the product information associated with the log information item when access to the log information item is attempted.

With this, use history of the intended product is obtained from use history of the electrical equipment that is used together with the intended product. Then, a provider of the intended product is identified from product information associated with the use history of the intended product, and access control is performed based on an access rule, for an accessing user who attempts to access the use history of the intended product. It is therefore possible to perform proper access control for the information related to the usage when the electrical equipment is used together with the intended product.

For example, the access control method according to an exemplary embodiment disclosed herein may include adding tag information indicating the product information to the log information item received in the receiving of a log information item, wherein in the storing, a tagged log information item may be stored which results from the addition of the tag information to the log information item in the adding of tag information, and in the controlling, whether or not to allow access to the tagged log information item may be controlled based on the tag information included in the tagged log information item.

With this, use history of the intended product is obtained from use history of the electrical equipment that is used together with the intended product. Then, a provider of the intended product is identified from product information added to the use history of the intended product, and access control is performed based on an access rule, for an accessing user who attempts to access the use history of the intended product. It is therefore possible to perform proper access control for the information related to the usage when the electrical equipment is used together with the intended product.

For example, in the controlling, whether or not to allow access may be controlled by referring to a rule which specifies whether or not to allow access by an accessing user who attempts to access the log information item stored in the storing, based on a relationship between the accessing user and a provider of the intended product identified by the tag information added to the log information item.

With this, access control is performed based on an access rule prespecified by a provider of the intended product, for an accessing user who attempts to access the use history of the intended product. It is therefore possible to perform proper access control for the information related to the usage when electrical equipment is used together with the intended product.

For example, in the receiving of a log information item, the log information item may be received which includes first equipment information indicating a type of the electrical equipment which is used, in the receiving of product information, second equipment information may be further received as the product information, the second equipment information indicating a type of the electrical equipment that is used together with the intended product, and in the adding of tag information, the tag information may be added to the log information item when the log information item includes the first equipment information which is identical to the second equipment information.

With this, a communication terminal is capable of adding a tag only to a log of the electrical equipment specified by the product information. The communication terminal, even when many types of electrical equipment items are connected to the communication terminal, is capable of adding a tag which corresponds to an intended product used with a corresponding one of the electrical equipment items. As a result, it is possible to perform proper access control for an accessing user who attempts to access the log of the electrical equipment. Therefore, it is possible to perform proper access control even when many types of electrical equipment items are connected.

For example, in the receiving of a log information item, the log information item may be received which includes first provider information for identifying a provider of the intended product that is used when the electrical equipment is used, in the receiving of product information, second provider information for identifying the provider of the intended product may be further received as the product information, and in the adding of tag information, the tag information may be added to the log information item when the log information item includes the first provider information which identifies the provider who is identical to the provider identified by the second provider information.

With this, a communication terminal is capable of adding a tag only to a log of a provider of the intended product that is specified by the product information. The communication terminal, even when many types of electrical equipment items are connected to the communication terminal, is capable of adding a tag which corresponds to an intended product used with a corresponding one of the electrical equipment items. As a result, it is possible to perform proper access control for an accessing user who attempts to access the log of the electrical equipment. Therefore, it is possible to perform proper access control even when many types of electrical equipment items are connected.

For example, in the receiving of product information, a number of times the tag information is to be added may be further received as the product information, and in the adding of tag information, after receiving, in the receiving of product information, the product information including the number of times the tag information is to be added in the adding of tag information, the tag information may be added to a plurality of the log information items identical in number to the number the tag information is to be added.

With this, it is possible to not only adding a tag to a single log information item for one input of the product information but also adding a tag to the specified number of log information items which is specified as the number of times. It is therefore possible to efficiently perform a tag adding process for the access control.

For example, in the receiving of a log information item, the log information item including a name of the intended product may be received, in the receiving of product information, a name of the intended product may be further received as the product information, and in the adding of tag information, the tag information may be added to the log information item received in the receiving of a log information item when the log information item includes the name of the intended product which is identical to the name of the intended product received in the receiving of product information.

With this, when the communication terminal receives product information including a name of the intended product and further receives a log information item of the electrical equipment which includes a name of the intended product, it is possible to add a tag to the log information including the name of the intended product which is identical. It is therefore possible to more accurately perform a tag adding process for the access control.

For example, wherein in the receiving of a log information item, the log information including an identification number of the intended product may be received, in the receiving of product information, an identification number of the intended product may be further received as the product information, and in the adding of tag information, the tag information may be added to the log information item received in the receiving of a log information item when the log information item includes the identification number which is identical to the identification number received in the receiving of product information.

With this, when the communication terminal receives product information including an identification number of the intended product and further receives a log information item of the electrical equipment which includes an identification number of the intended product, it is possible to add a tag to the log information item which includes an identification number of the intended product which is identical. The communication terminal is capable of adding different tags to intended products each having a different unique number even when the intended products are of the same type. As a result, it is possible to perform proper access control for an accessing user, for each of the identification numbers of the products. It is therefore possible to more accurately perform a tag adding process for the access control.

For example, in the storing, the log information item and a statistical log information item may be stored as the log information items, the statistical log information item being generated by performing statistical processing on a plurality of the log information items, wherein in the controlling, whether or not to allow access to each of the log information item and the statistical log information item may be controlled by referring to a rule which specifies whether or not to allow access by an accessing user who attempts to access the log information item and the statistical log information item.

With this, it is possible to perform different access control to each of the raw data of the log information item and the statistical data of the log information item. Thus, it is possible to perform access control with finer granularity.

For example, in the receiving of product information, the product information may be received by reading a quick response (QR) code attached to the intended product, and in the receiving of a log information item, the log information item may be received via a near field communication (NFC) with the electrical equipment.

With this, the communication terminal can receive the product information or the log information item using efficient data input means or data transfer means. It is therefore possible for the communication terminal to more efficiently receive information for access control.

For example, the access control method may further include generating setting information of the electrical equipment and outputting the setting information to the electrical equipment, wherein in the receiving of a log information item, the log information item may be received which indicates use history of the electrical equipment to which the setting information is outputted in the generating.

With this, a user can create setting information of the electrical equipment on the communication terminal on which a more abounding user interface is generally mounted than the electrical equipment, and can perform settings of the electrical equipment by providing the setting information to the electrical equipment. The user creates the setting information of the electrical equipment on the communication terminal, and thus it is possible to perform detailed setting more accurately at higher speed compared to the case of performing the settings on the electrical equipment. As a result, a useful log information item can be obtained for the provider of the intended product.

For example, wherein in the controlling, whether or not to allow access may be controlled by referring to a rule including a first rule that allows access to the log information item by an accessing user who attempts to access the log information item, when the accessing user is identical to a provider of the intended product indicated by the tag information.

With this, access control is performed such that the provider of the intended product can access use history of the intended product. It is therefore possible to perform proper access control for the information related to the usage when the electrical equipment is used together with the intended product.

For example, wherein in the controlling, whether or not to allow access may be controlled by referring to a rule including a second rule that allows access to the log information item by an accessing user who attempts to access the log information item, when the accessing user is included in a user group prespecified by a provider of the intended product.

With this, access control is performed such that only a specified accessing user can access use history of the intended product. It is therefore possible to perform proper access control for the information related to the usage when the electrical equipment is used together with the intended product.

For example, wherein in the controlling, whether or not to allow access may be controlled by referring to a rule including a third rule that denies access to the log information item by an accessing user who attempts to access the log information item, when the accessing user is included in a user group prespecified by a provider of the intended product.

With this, access control is performed such that only a specified accessing user can access use history of the intended product. It is therefore possible to perform proper access control for the information related to the usage when the electrical equipment is used together with the intended product.

In addition, an access control system according to an aspect of the present invention is an access control system including a communication terminal and a server, wherein the communication terminal includes: a log inputting unit configured to receive a log information item indicating use history of electrical equipment that is used together with an intended product; a product information inputting unit configured to receive product information including information for identifying the intended product; and a transmitting unit configured to transmit, to the server, the log information item received by the log inputting unit and the product information received by the product information inputting unit, and the server includes: a receiving unit configured to receive the log information item and the product information from the communication terminal; a log storage processing unit configured to store the log information item and the product information in association with each other, the log information item and the product information being received by the receiving unit; and an access controlling unit configured to control whether or not to allow access to the log information item based on the product information associated with the log information item when access to the log information item is attempted.

This produces an advantageous effect equivalent to the above-described access control method.

In addition, a communication terminal according to an aspect of the present invention is included in the access control system including a communication terminal and a server, wherein the communication terminal includes: a log inputting unit configured to receive a log information item indicating use history of electrical equipment that is used together with an intended product; a product information inputting unit configured to receive product information including information for identifying the intended product; and a transmitting unit configured to transmit, to the server, the log information item received by the log inputting unit and the product information received by the product information inputting unit, and the server includes: a receiving unit configured to receive the log information item and the product information from the communication terminal; a log storage processing unit configured to store the log information item and the product information in association with each other, the log information item and the product information being received by the receiving unit; and an access controlling unit configured to control whether or not to allow access to the log information item based on the product information associated with the log information item when access to the log information item is attempted.

This produces an advantageous effect equivalent to the above-described access control method.

In addition, a server according to an aspect of the present invention is included in the access control system including a communication terminal and a server, wherein the communication terminal includes: a log inputting unit configured to receive a log information item indicating use history of electrical equipment that is used together with an intended product; a product information inputting unit configured to receive product information including information for identifying the intended product; and a transmitting unit configured to transmit, to the server, the log information item received by the log inputting unit and the product information received by the product information inputting unit, and the server includes: a receiving unit configured to receive the log information item and the product information from the communication terminal; a log storage processing unit configured to store the log information item and the product information in association with each other, the log information item and the product information being received by the receiving unit; and an access controlling unit configured to control whether or not to allow access to the log information item based on the product information associated with the log information item when access to the log information item is attempted.

This produces an advantageous effect equivalent to the above-described access control method.

In addition, an access control method according to an aspect of the present invention is an access control method performed by a communication terminal in an access control system including: the communication terminal that transmits a log information item indicating use history of electrical equipment used together with an intended product; and a server that controls whether or not to allow access to the log information item based on product information associated with the log information item transmitted by the communication terminal, the access control method comprising: receiving the log information item indicating the use history of the electrical equipment that is used together with the intended product; receiving the product information including information for identifying the intended product; and transmitting the received log information item and the received product information to the server.

This produces an advantageous effect equivalent to the above-described access control method.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

(Embodiment 1)

This exemplary embodiment will describe access control which is performed when access to a log (log information item) which is generated when a user uses a washing machine that is an example of electrical equipment together with a laundry detergent that is an example of a product (intended product) is attempted by Company A that is the provider of the laundry detergent and Company B that is another company in the same trade as Company A. It is to be noted that "provider" means someone who provides an intended product to those who use the intended product, and specifically means a manufacturer, a seller, a wholesale dealer, a retail seller, and so on. In addition, "provider" may include a business operator specified by the manufacturer and the like.

It is to be noted that access includes two communication modes described below. One is a communication mode in which a person who attempts to obtain information (also referred to as an acquirer) transmits, to a person who holds the information (also referred to as a holder) a request signal for obtaining the information, and the holder gives the information to the acquirer in response to the request signal (so-called Pull communication). Furthermore, the other is a communication mode in which information is passed from the holder to the acquirer unilaterally without using the above-described request signal (so-called Push communication).

It is to be noted that, according to this exemplary embodiment, the communication terminal and the electrical equipment correspond one-by-one. It is assumed that, for example, the electrical equipment is a washing machine that is present at home and the communication terminal is a mobile phone terminal of a mother of the home who uses the washing machine.

[1.1 Overall Configuration of Access Control System]

FIG. 1 is a block diagram illustrating an access control system 1 according to this exemplary embodiment.

As illustrated in FIG. 1, the access control system 1 according to this exemplary embodiment includes a communication terminal 11 and a server 12. Then, the communication terminal 11 includes: a product information inputting unit 111; a log inputting unit 112; a tag adding unit 113;

and a transmitting unit 114. In addition, the server 12 includes: a receiving unit 121; a tagged log storage processing unit 122; an access control unit 123; and an access rule storage unit 124A.

[1.2 Configuration of Communication Terminal]

[1.2.1 Product Information Inputting Unit]

The product information inputting unit 111 receives product information that is information related to an intended product used with electrical equipment (not illustrated). The product information includes at least information for identifying the intended product. Specific examples of the product information include a name or an abbreviated name of a provider of the intended product, a name or an abbreviated name of the intended product, and so on. It is to be noted that specific examples of a combination of the electrical equipment and the intended product includes: a washing machine and laundry detergent; a microwave oven and cooking ingredient for microwave cooking; a rice cooker and ingredients, and so on. In addition, the product information is determined for each intended product, and thus the product information changes when the intended product changes. To be specific, when a user starts using laundry detergent that is to be used with the washing machine, the product information inputting unit 111 receives product information related to new laundry detergent. In addition, when a user inputs product information corresponding to a communication terminal, with the intention to be a usage monitor of the laundry detergent, the product information inputting unit 111 receives the product information related to the new laundry detergent. The product information is changed as described above.

Figure 5A:
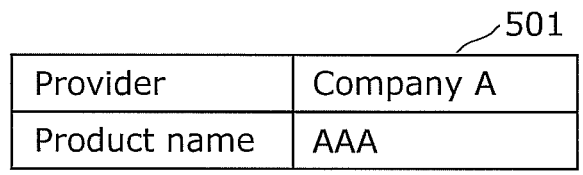
FIG. 5A illustrates an example of product information according to Embodiment 1.

The product information includes at least information for identifying the intended product. FIG. 5A illustrates a specific example of the product information.

FIG. 5A is an example of the product information of laundry detergent AAA that is an example of the intended product. The product information 501 illustrated in FIG. 5A includes information A for identifying a provider of the intended product (the field of "Provider") and a name AAA of the intended product (the field of "Product name"). It is to be noted that the product information may further include information for identifying the electrical equipment with which the intended product is used (information such as a washing machine, or a specific product number of a specific manufacturer).

[1.2.2 Log Inputting Unit]

The log inputting unit 112 is connected to electrical equipment (not illustrated) and receives a log (log information) that indicates use history of the electrical equipment. The log includes, for example, setting information for operating the electrical equipment, or information related to a result of operating the electrical equipment. Connection with the electrical equipment can be implemented by radio communication, for example.

Figure 5B:
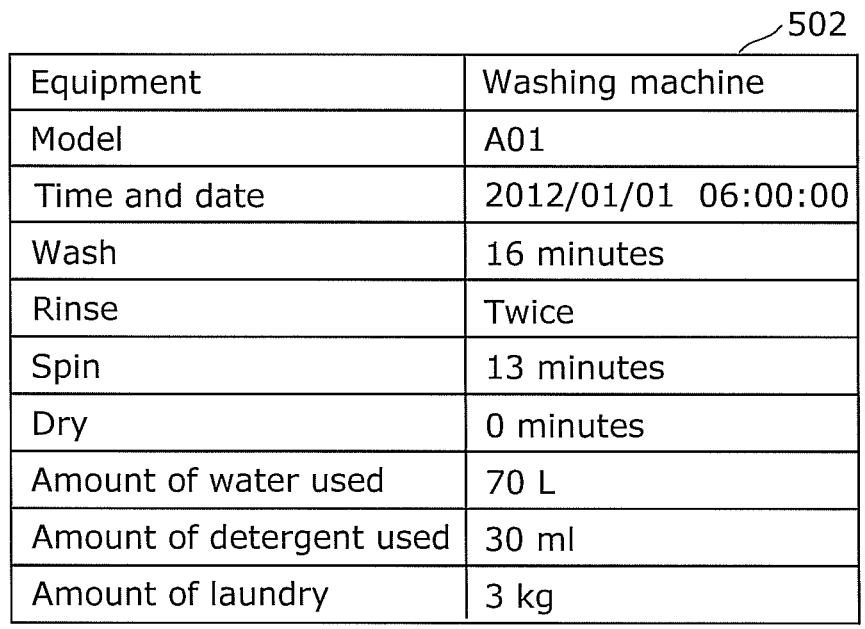
FIG. 5B illustrates an example of a log of electrical equipment according to Embodiment 1.

FIG. 5B illustrates a specific example of the log of the electrical equipment.

FIG. 5B illustrates an example of a log of a washing machine that is an example of the electrical equipment. A log 502 of the electrical equipment illustrated in FIG. 5B includes: a type of the electrical equipment (the field of "Equipment") and a model name of the electrical equipment (the field of "Model") as information unique to the electrical equipment; and the time and date of usage (the field of "Time and date"), the amount of time required for washing (the field of "Wash"), the number of times of rinsing (the field of "Rinse"), the amount of time required for spin-drying (the field of "Spin"), and the amount of time required for drying (the field of "Dry") as setting information at the time when the electrical equipment was used. In addition, the log 502 includes the amount of water used, the amount of detergent used, and the amount of laundry, as information items related to a result of using the electrical equipment. It is to be noted that the information included in the log may be different according to the type of the electrical equipment or may be common among a plurality of types of electrical equipment items. The example illustrated in FIG. 5B shows that the electrical equipment is a washing machine, the model number is A01, the time and date of the washing log is Jan. 1, 2012, at 6 a.m., the settings for the washing, rinsing, spin-drying, and drying are 16 minutes, twice, 13 minutes, and 0 minutes, respectively. In addition, it is shown that the amount of water that is actually used, the amount of detergent automatically released, and the amount of laundry at the time are 70 liters (L), 30 ml, and 3 kg, respectively.

[1.2.3 Tag Adding Unit]

The tag adding unit 113 adds, to the log that is received by the log inputting unit 112, a tag which indicates product information that is received by the product information inputting unit 111. Specifically, the tag may indicate the details of the product information 501 illustrated in FIG. 5A, or a code (numerical value) corresponding to the details of the product information 501 (for example "1111"). In addition, one example of the log to which a tag is added is the log 502 illustrated in FIG. 5B which includes a header part to which the product information 501 illustrated in FIG. 5A is added. It is to be noted that a log to which a tag is added is also referred to as a tagged log. Furthermore, since the tag indicates product information, the tagged log can be referred to as a log with product information.

Figure 5C:
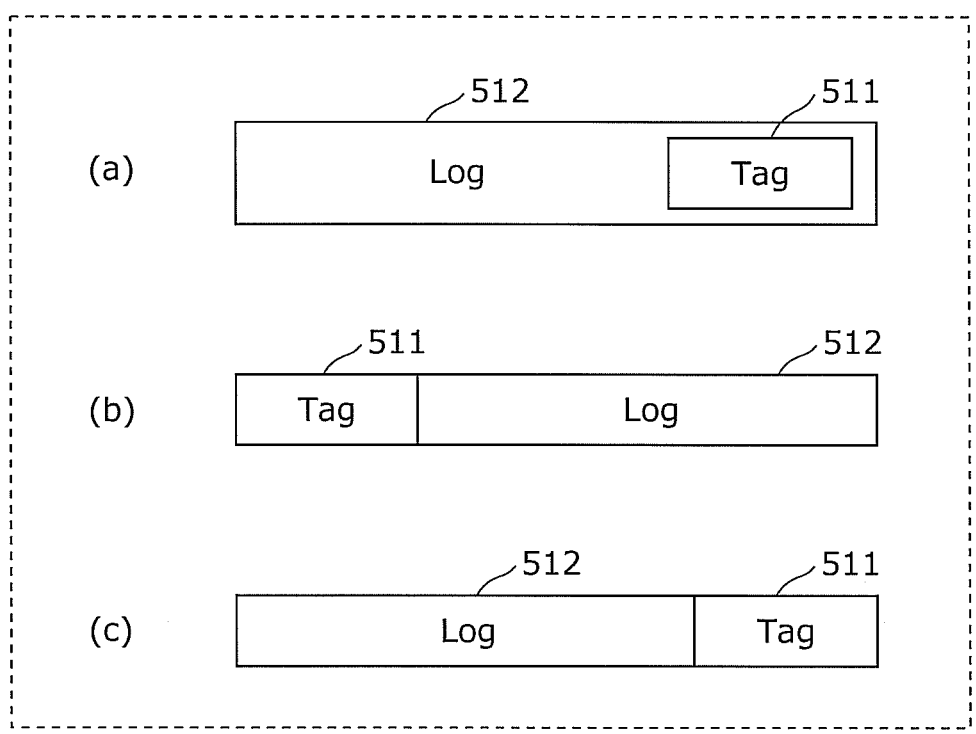
FIG. 5C is a diagram explaining tagged logs.

FIG. 5C is a diagram explaining the tagged logs. The following describes a tag 511 which is added to a log 512 received by the log inputting unit 112. When a tag is embedded in part of a log, the log 512 has the tag 511 embedded in part thereof, as illustrated in (a) in FIG. 5C. When a tag is embedded in a header part of a log, the log 512 has the tag 511 concatenated at the top part thereof, as illustrated in (b) in FIG. 5C. When a tag is embedded in a footer part of a log, the log 512 has the tag 511 concatenated at the end part thereof, as illustrated in (c) in FIG. 5C.

[1.2.4 Transmitting Unit]

The transmitting unit 114 transmits, to the server 12, the log to which a tag is added by the tag adding unit 113. It is to be noted that, as to the timing of transmission, the transmitting unit 114 may be connected to the server 12 to transmit the log after the log information item is inputted, or may be connected to the server 12 to transmit the log at any time after the log information items are accumulated.

[1.3 Configuration of the Server]

[1.3.1 Receiving Unit]

The receiving unit 121 receives the log to which a tag is added and which is transmitted by the transmitting unit 114 of the communication terminal 11.

[1.3.2 Tagged Log Storage Processing Unit]

The tagged log storage processing unit 122 stores the log to which the tag is added to a log storage unit (not illustrated). It is to be noted that the log storage unit may be integrated with the tagged log storage processing unit 122, may be included by the server 12, or may be present outside the server 12. When the log storage unit is present outside the server 12, the tagged log storage processing unit 122 stores the log into the log storage unit via a communications line and the like.

[1.3.3 Access Control Unit]

The access control unit 123 receives an access from: Company A who is an accessing user that accesses the log stored by the tagged log storage processing unit 122 and who is a provider of a laundry detergent; or Company B who is one of the other companies in the same trade as Company A. Then, the access control unit 123 controls whether or not access to the log to which the tag is added is to be allowed, by referring to the rule 124 that is stored in the access rule storage unit 124A.

It is to be noted that the above description explains the case where Company A or Company B accesses the server using Pull communication. In the case of Push communication from the server to Company A or Company B, the access control unit 123 controls whether or not access to the log to which the tag is added is to be allowed, for the communications from the server to Company A or Company B, by referring to the rule 124 that is stored in the access rule storage unit 124A.

[1.3.4 Access Rule Storage Unit]

Figure 6:
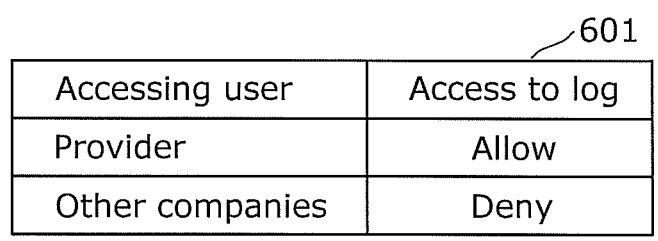
FIG. 6 illustrates an example of a rule according to Embodiment 1.

The access rule storage unit 124A stores the rule 124 that indicates whether or not access to a log from the accessing user is to be allowed. The rule 124 indicates whether or not access is to be allowed based on the relationship between the accessing user and the provider of the intended product. The following describes a specific example of the rule 124. FIG. 6, FIG. 7, and FIG. 8 illustrate examples of the rule.

FIG. 6 illustrates an example of a rule according to this exemplary embodiment. A rule 601 illustrated in FIG. 6 is a rule which indicates that access to a log by the provider of the detergent is allowed, and that access to a log by the other companies in the same trade as the provider of the detergent is denied. In accordance with the rule 601, for example, Company A who is the provider of a laundry detergent AAA is allowed to access the log of the laundry detergent AAA, while Company B who is one of the other companies in the same trade as Company A is denied to access the log. In other words, Company A can access the log of the laundry detergent AAA in a monopolistic manner (exclusively). It is to be noted that, in this case, an accessing user who is not indicated in the rule 601 may be allowed or may be denied to access the log. As a method of implementing the above, the details described above may be added to the rule 601 (for example, "allow" access to a log may be added to an accessing user "user other than the user described above"). In addition, it can be implemented by a method of which the access control unit 123 is preset such that access by an accessing user who is not registered on the rule 601 is allowed or denied, and the settings will be followed in performing operations.

FIG. 7 illustrates an example of another rule according to this exemplary embodiment. A rule 701 illustrated in FIG. 7 is a list which indicates accessing users who are allowed to access (a so-called whitelist). In addition, it indicates whether or not each of the accessing users is allowed to access each of raw data and statistical data. In accordance with the rule 701, access control is performed as below. That is, Company B is allowed to access the raw data and the statistical data in the log of the laundry detergent AAA. In addition, Company C and Company D are allowed to access only the statistical data. In addition, accessing to data by accessing users who are not registered on the whitelist are denied.

FIG. 8 illustrates an example of another rule according to this exemplary embodiment. A rule 801 illustrated in FIG. 8 is a list which indicates accessing users who are denied to access (a so-called blacklist). In addition, it indicates whether or not each of the accessing users is denied to access each of raw data and statistical data. In accordance with the rule 801, access control is performed as below. That is, Company F is denied to access the raw data and the statistical data of the log of the laundry detergent AAA. In addition, Company G and Company H are denied to access the raw data. In addition, accessing users who are not registered on the blacklist are allowed to access data.

It is to be noted that the rules 601, 701, or 801 may be preset by Company A who is the provider of the laundry detergent, or may be set by a trader specified by Company A.

It is to be noted that the server 12 is capable of performing access control for the accessing users by combining these rules. In this case, it is likely that allowing and denying access for the same accessing user coexist in a rule. In other words, it is likely that rules of contradictory access control coexist. In this case, it is possible to set an order of priority of the rules to be applied and apply the rule in the order corresponding to the order of priority, thereby enabling consistently performing the access control. In addition, this allows switching of applicability of the rules according to the state, and thus it is possible to efficiently operate the rules.

[1.4 Configuration when Using Access Control System]

Figure 2:
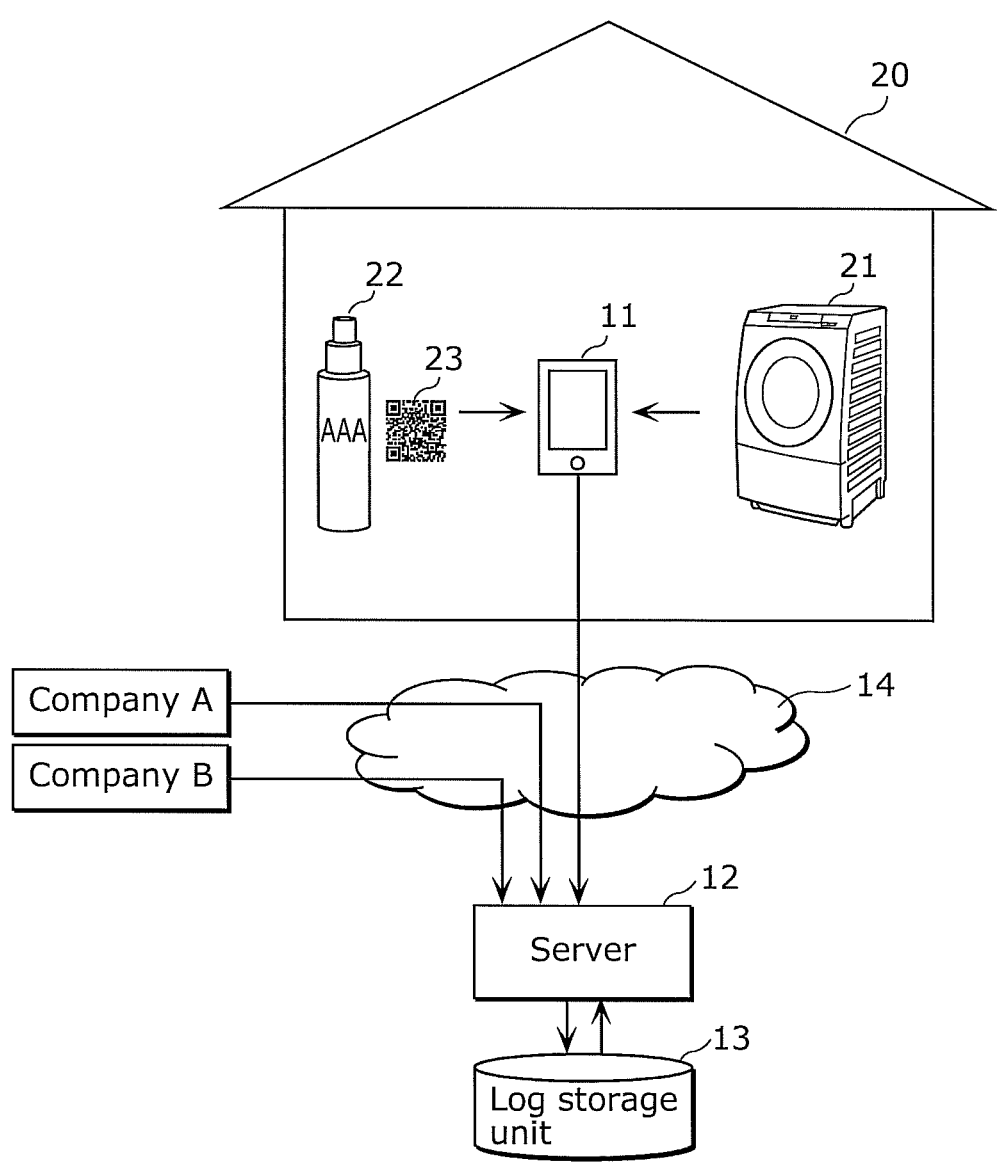
FIG. 2 is a diagram illustrating an example of using the access control system according to Embodiment 1.

FIG. 2 is a diagram illustrating an example of using the access control system 1 according to this exemplary embodiment.

As illustrated in FIG. 2, the access control system 1 is used with the configuration including the communication terminal 11 in a user home 20, a network 14, and a server 12.

A washing machine 21 and a laundry detergent 22 are present in the user home 20. The laundry detergent 22 has a quick response (QR) code 23 attached thereto, which indicates a provider of the laundry detergent 22 and the like. The communication terminal 11 can communicate with the server 12 via the network 14. A log storage unit 13 is connected to the server 12.

With this configuration, the communication terminal 11 receives information from the laundry detergent 22 (the QR code 23) and the washing machine 21, performs a tag adding process that will be described later on the information, and then transmits the information to the server 12. With the intention to obtain the information, Company A who is the provider of the laundry detergent and Company B who is one of the other companies in the same trade as Company A access the server 12 via the network 14.

It is to be noted that although FIG. 2 illustrates the mode in which the log storage unit 13 is connected to the server 12, the log storage unit 13 can be present in the server 12 as one of the functions of the server 12.

In addition, it is also possible to form a configuration in which there are a plurality of communication terminals 11 and the plurality of communication terminals 11 send logs to the server 12. In this case, it is assumed that, for example, the electrical equipment is a washing machine that is present at home and the communication terminals are mobile phone terminals of a mother and a father who use the washing machine in the home. In this case, ID information of the mobile terminals may be added to the log and transmitted to the server. With this, it is possible to record setting information of the electrical equipment separately for each user.

It is to be noted that the communication terminal 11 may be installed in the electrical equipment as one of the functions of the electrical equipment. In other words, the communication terminal 11 may be built into the electrical equipment. More specifically, the communication terminal 11 and the electrical equipment can be configured as below.

(1) Configuration in which the communication terminal 11 is included inside the electrical equipment According to this configuration, a user holds a product to pass a QR code of the product over a QR code reader of the communication terminal 11 in the electrical equipment, so that product information is read by the communication terminal 11.

(2) Configuration in which the communication terminal 11 and the electrical equipment are separated According to this configuration, a user passes the communication terminal 11 over the QR code of a product, so that product information is read by the communication terminal 11.

[1.5 Log Storage Process in Access Control System]

Figure 3:
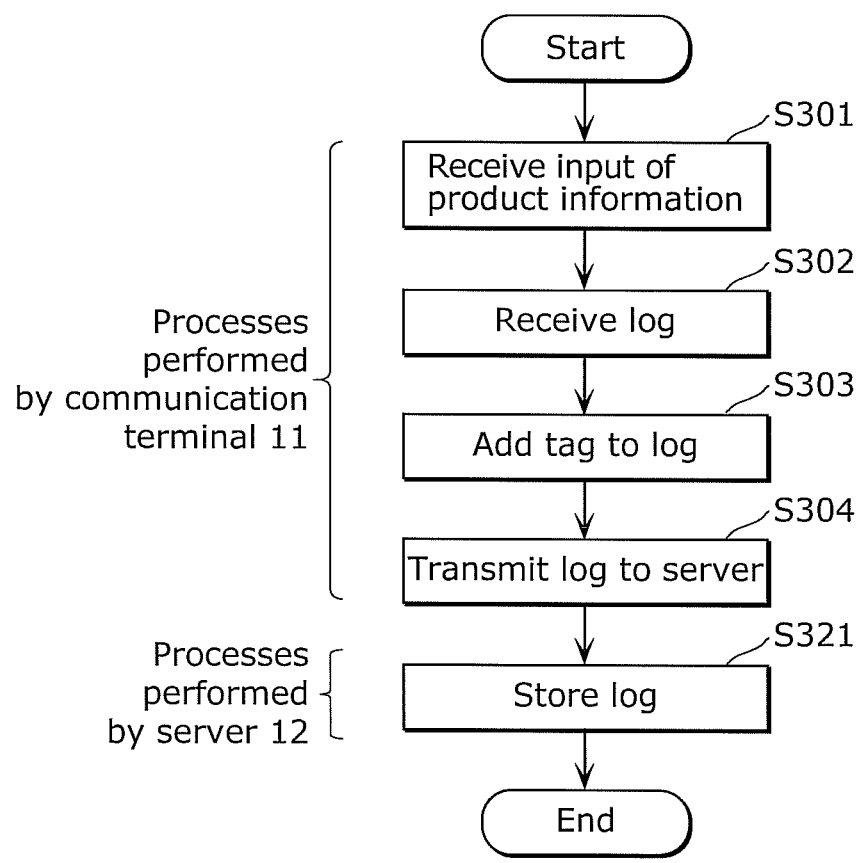
FIG. 3 is a flowchart illustrating a log storage process performed in the access control system according to Embodiment 1.

FIG. 3 is a flowchart illustrating a log storage process performed in the access control system according to this exemplary embodiment. The following describes a log storage process performed in the access control system 1 illustrated in FIG. 3.

First, the product information inputting unit 111 in the communication terminal 11 receives an input of product information (S301). There are a variety of methods for inputting the product information. One example of the methods for inputting the product information is, for example, a method of reading a QR code attached to an intended product using a QR code reader. Another example is a method of inputting, by a user, a code described on a package or the like of the intended product into the communication terminal 11. In addition, it is also possible to implement by a method of inputting into the communication terminal 11 by accessing a uniform resource locator (URL) that is described on a package or the like of the intended product.

Next, the log inputting unit 112 of the communication terminal 11 receives a log of electrical equipment (S302). There are a variety of methods for receiving a log of the electrical equipment. One example of the methods for receiving a log of the electrical equipment is, for example, a method of receiving, by the communication terminal 11, through a radio communication such as near field communication (NFC), the IEEE802.11 standard, and so on. In addition, there are methods of receiving, by the communication terminal 11, through a wired communication such as Ethernet (registered trademark), power line communication (PLC), and so on.

The log of the electrical equipment includes: setting information at the time the electrical equipment is used; information related to a result of using the electrical equipment, and so on. The log of the electrical equipment is, for example, inputted into the communication terminal 11 by being transferred to the communication terminal 11 through the communication between the communication terminal 11 and the electrical equipment after a user inputted settings into the electrical equipment in order to use the electrical equipment with desired settings. It is to be noted that, after a user inputs settings one time to the electrical equipment, the communication terminal 11 may receive an input of the settings of the one time, or after a user inputs settings multiple times to the electrical equipment, the communication terminal 11 may receive inputs of the settings information items of the multiple times.

It is to be noted that the order of Step S301 and Step S302 may be inverse.

Next, the tag adding unit 113 of the communication terminal 11 adds a tag to the log (tag adding process) (S303). A tag is additional information that indicates the details of the product information 501. Adding a tag to a log means, more specifically, that embedding additional information that indicates the details of the product information 501 into a part of the log or a header part (or a footer part) of the log.

The tag adding unit 113 adds, to the log that is received by the log inputting unit 112, a tag which indicates the product information that is received by the product information inputting unit 111. Here, after the product information inputting unit 111 receives the product information, the log inputting unit 112 may add a tag that indicates the product information to the received log. In addition, upon receipt of the product information by the product information inputting unit 111, the log inputting unit 112 may add a tag that indicates the product information to a latest log among the logs received by the log inputting unit 112. According to this exemplary embodiment, after the product information inputting unit 111 receives the product information once, the log inputting unit 112 adds a tag that indicates the product information to the first one of the logs received by the log inputting unit 112.

The following describes a specific example of the processes performed by the tag adding unit 133 with reference to FIG. 5C. The process performed by the tag adding unit 113 is described in which the tag 511 is added to the log 512 which is received by the log inputting unit 112. When a tag is embedded in part of a log, the log 512 has the tag 511 embedded in part thereof, as illustrated in (a) in FIG. 5C. When a tag is embedded in a header part of a log, the log 512 has the tag 511 concatenated at the top part thereof, as illustrated in (b) in FIG. 5C. When a tag is embedded in a footer part of a log, the log 512 has the tag 511 concatenated, at the end part thereof, as illustrated in (c) in FIG. 5C.

Next, the transmitting unit 114 of the communication terminal 11 transmits the log to which the tag indicating the product information is added, to the server 12 via the communications line (S304).

Next, the receiving unit 121 of the server 12 stores the log received from the communication terminal 11, into the log storage unit 13 (S305). It is to be noted that the log storage unit 13 may be included by the server 12, or may be present outside the server 12.

Through the processes described above, the log of the washing machine 21 after the tag related to the laundry detergent 22 is added is stored in the log storage unit 13 by the server 12.

It is also possible that a plurality of the communication terminals 11 transmit equivalent logs to the server 12 in parallel. In this case, an ID for identifying the communication terminal 11 may be included in the tag and added to the log. The, the communication terminal 11 is uniquely identified from the ID added to the log stored by the server.

[1.6 Access Control Process Performed in the Access Control System]

Figure 4:
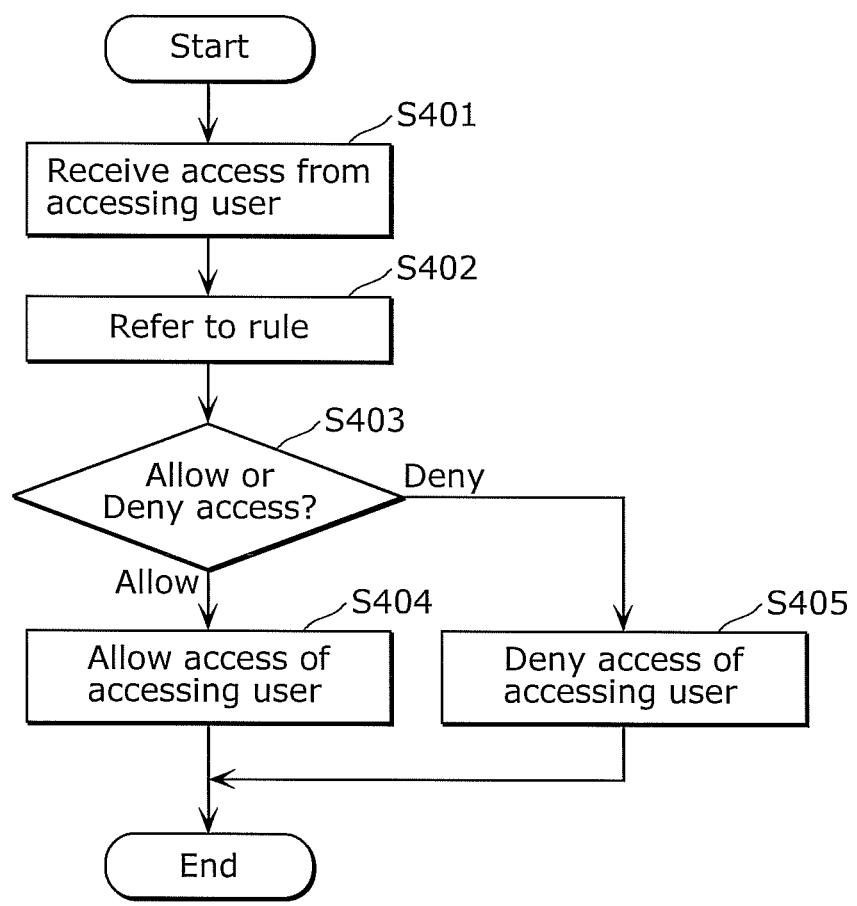
FIG. 4 is a flowchart illustrating access control performed by the access control system according to Embodiment 1.

FIG. 4 is a flowchart illustrating access control performed in the access control system according to this exemplary embodiment. The following describes, with reference to FIG. 4, the access control using tag information added to a log, which is performed when Company A who is the provider of a laundry detergent and Company B who is one of the other companies in the same trade as Company A access the server 12.

First, the server 12 receives an access to the log from an accessing user (Company A or Company B) (S401).

Next, the server 12 refers to the rule 124 to determine whether to allow or deny the access from the accessing user (S402 and S403). The rule 124 indicates whether or not the access is to be allowed based on the relationship between the accessing user who attempts to access the log and the provider of the intended product. The log includes information on the provider of the intended product, which is added as a tag. The server 12 uses the information of the tag added to the log, to determine, according to the rule 124, whether or not an access to the log by the accessing user is to be allowed. In addition, the rule 124 may indicate whether an access to each of the raw data and the statistical data is to be allowed or denied. The raw data is information on each of the logs. The statistical data is data generated by performing statistical processing on the logs. In addition, the rule 124 may also indicate whether to allow or deny access to each processed data that is data after each of the logs are processed. Here, the process is, for example, to delete personal information included in the log.

Next, the server 12 performs access control on the access by an accessing user based on the result of the determination in Step S403 which indicates whether the access is to be allowed or denied. More specifically, when it is determined that the access is to be allowed in S403 ("allow" in S403), the access by the accessing user is allowed (S404). On the other hand, when it is determined that the access is to be denied in S403 ("deny" in S403), the access by the accessing user is denied (S405).

Through the processes described above, the server 12 is capable of controlling an access to a log by the accessing user, by referring to the rule 124 related to the access control. The following describes the flow of data in the access control, with reference to FIG. 9.

Figure 9A:
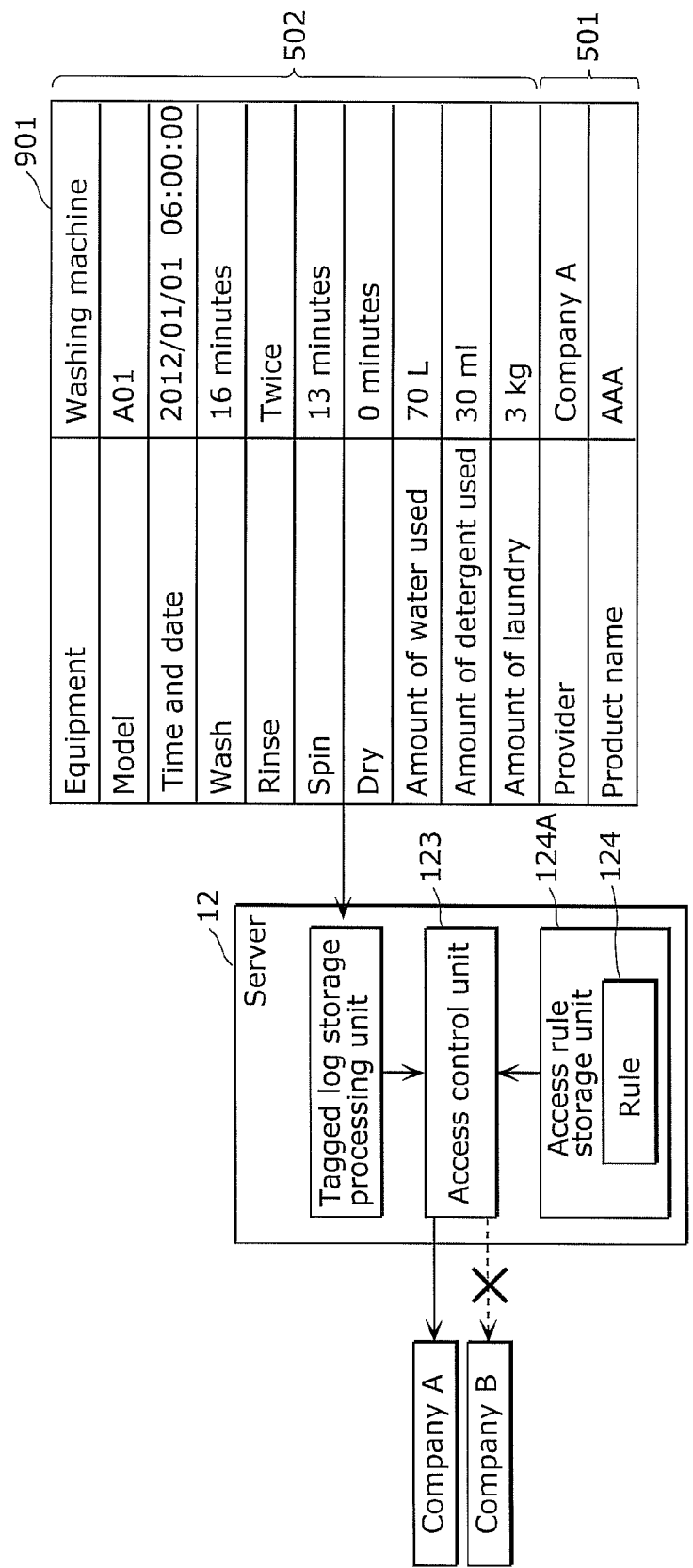
FIG. 9A is a diagram explaining a data flow in the access control according to Embodiment 1.

FIG. 9A is a diagram explaining data flow in the access control according to this exemplary embodiment.

In FIG. 9A, data (tagged log) 901 includes the log 502 of the washing machine and the product information 501 of the laundry detergent AAA that is added to the log 502 as a tag. The tagged log 901 is stored by the tagged log storage processing unit 122 of the server 12 via the communication terminal 11. Next, when Company A who is the provider of the laundry detergent AAA accesses the log, the access control unit performs the access control based on the rule 601 to allow the access, and then Company A can obtain the log. On the other hand, when Company B who is not the provider of the laundry detergent AAA accesses the log, the access control unit performs the access control to deny the access, and then Company B cannot obtain the log. As described above, only Company A who is the provider of the laundry detergent AAA can obtain the log. It is therefore possible to perform the access control for the information related to the usage when electrical equipment is used together with the intended product.

The following describes example of a display screen of the communication terminal in the access control system according to this exemplary embodiment.

FIG. 9B is a diagram illustrating a first example of a display image of a communication terminal used in the access control system according to this exemplary embodiment.

The display image illustrated in FIG. 9B is an example of the display image displayed at the time when the communication terminal 11 receives product information (Step S301 in FIG. 3). In FIG. 9B, a message is displayed which urges a user to capture a QR code of the product (goods). In addition, an image that is to be obtained as a result of the capturing is displayed together with the above-described message. When the user operates an "import" button, the image displayed on the display screen at the time of operation is obtained as a captured image.

FIG. 9C is a diagram illustrating a second example of a display image of a communication terminal used in the access control system according to this exemplary embodiment.

The display image illustrated in FIG. 9C is an example of the display image displayed at the time when the communication terminal 11 receives product information (Step S301 in FIG. 3, for example), which is displayed after the QR code is imported on the display image illustrated in FIG. 9B. In FIG. 9C, a period of time for transmitting the log of the product to the server 12 (monitoring period for the goods) and information related to reward (incentive) to be received by the user are described.

FIG. 9D is a diagram illustrating a third example of a display image of the communication terminal used in the access control system according to this exemplary embodiment.

The display image illustrated in FIG. 9D is an example of the display image displayed at the time when the communication terminal 11 receives a log of the electrical equipment (Step S302 in FIG. 3). In FIG. 9D, a message is displayed which urges touching the washing machine with the communication terminal 11 with the aim of obtaining the log from the washing machine that is the electrical equipment.

Figure 9E:
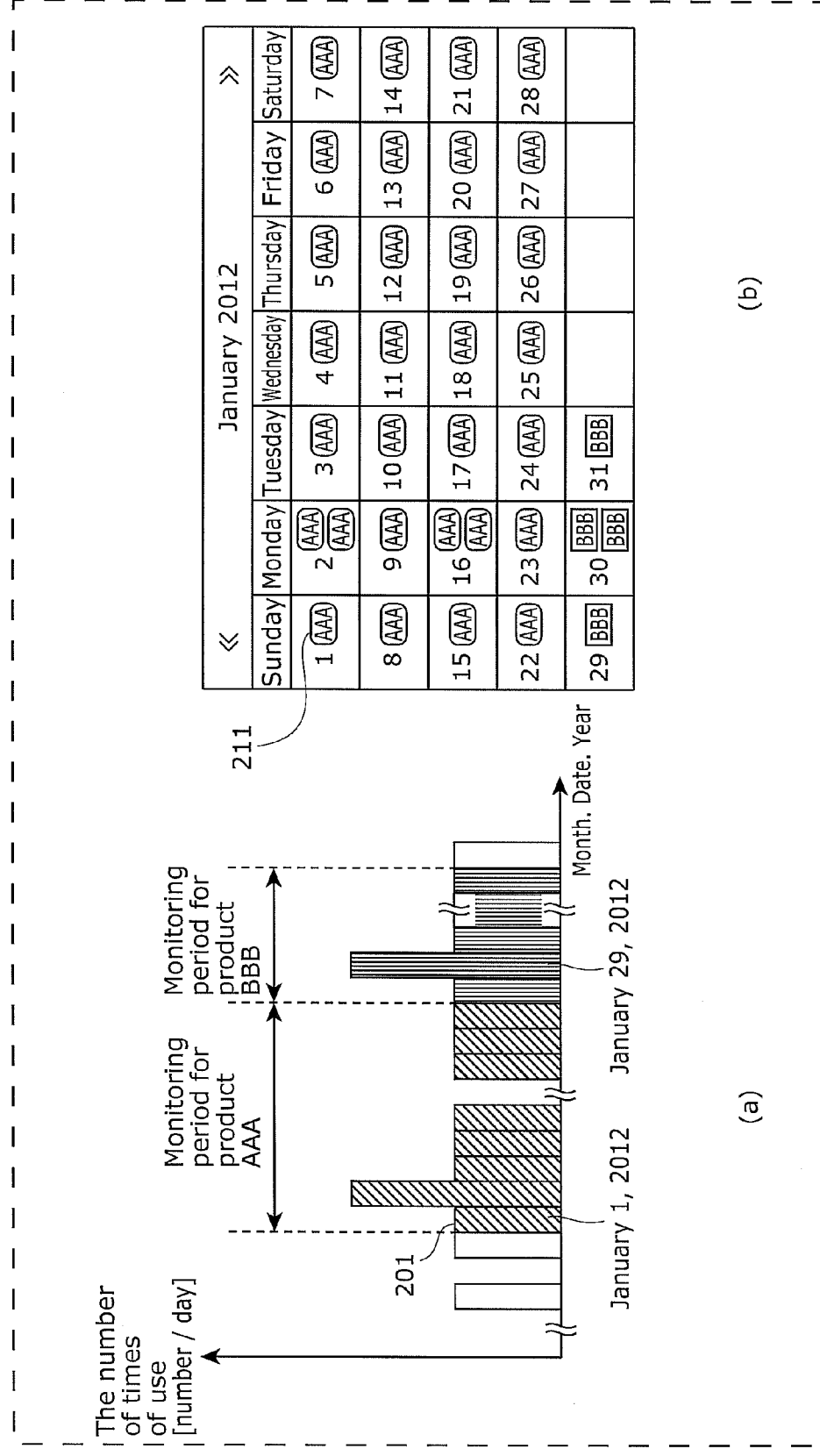
FIG. 9E is a diagram illustrating a fourth example of a display image of a communication terminal used in the access control system according to Embodiment 1.

FIG. 9E is a diagram illustrating a fourth example of a display image of the communication terminal used in the access control system according to this exemplary embodiment.

(a) in FIG. 9E is an example of the display image of a list of use history of the electrical equipment which is obtained by the user. In (a) in FIG. 9E, the horizontal axis indicates the date (Month, Date, Year) on which the electrical equipment is used, and the vertical axis indicates the number of times that the electrical equipment was used per day. In addition, in the case where the electrical equipment was used together with a product and a log was provided to the server at the time of use of the electrical equipment, the list of use history shows accordingly. For example, (a) in FIG. 9E shows that the electrical equipment was used once and at this time the product AAA was used as the product together with the electrical equipment, on Jan. 1, 2012. In addition, it shows that the electrical equipment was used twice and at this time the goods BBB was used as the product together with the electrical equipment, on Jan. 30, 2012. It is to be noted that, for example, when a rectangle 201 corresponding to the use on Jan. 1, 2012 is selected, the log 502 (FIG. 5B) or a tagged log (FIG. 9A) at the time of the use may be displayed.

(b) in FIG. 9E is an example of the display image of a list of use history of the electrical equipment which is obtained by the user. In (b) in FIG. 9E, days included in a month are shown in a calendar format with one row representing a week, and use history of the electrical equipment used on each day is shown. In addition, in the case where the electrical equipment was used together with a product and a log was provided to the server at the time of use of the electrical equipment, the list of use history shows accordingly. It is to be noted that, for example, when a graphic 211 corresponding to the use on Jan. 1, 2012 is selected, the log 502 (FIG. 5B) or a tagged log (FIG. 9A) at the time of the use may be displayed.

It is to be noted that the image illustrated in FIG. 9E is explained as an image displayed on the communication terminal, however, the image also can be used as an image displayed on a terminal which accesses the access control system.

In other words, when an employee of Company A accesses the access control system using a terminal, an image such as the image of (a) or (b) in FIG. 9E may be displayed on the display screen of the terminal. In addition, in the case where there are plural goods monitors of Company A (10 people, for example), first, an image such as the image of (a) or (b) in FIG. 9E which shows integrated information of all of the goods monitors may be displayed, and then when one of the goods monitors is selected, an image such as the image of (a) or (b) in FIG. 9E may be displayed. In addition, when a graphic 211 corresponding to the use on a specific date (on Jan. 1, 2012, for example) is selected, the log 502 (FIG. 5B) or a tagged log 901 (FIG. 9A) at the time of the use may be displayed.

(Modification 1 of Embodiment 1)

Modification 1 of Embodiment 1 will describe access control which is performed when access to a log which is generated when a user uses a microwave oven that is an example of the electrical equipment together with cooking ingredient for microwave cooking that is an example of the intended product, is attempted by Company E that is the provider of the cooking ingredient for microwave cooking and Company F that is one of the other companies in the same trade as Company E.

Modification 1 of this exemplary embodiment is different from this exemplary embodiment 1 in the format of the product information and the format of the log. The differences will be described in detail.

FIG. 10A is an example of the product information of cooking ingredient for microwave cooking EEE that is an example of the intended product. The product information 1001 illustrated in FIG. 10A indicates that the electrical equipment that is used together with the intended product is a microwave oven (the field of "Target equipment"), and the information for identifying the provider of the intended product is Company E (the field of "Provider"). It is to be noted that the product information may further include information for identifying the electrical equipment in which the intended product is used.

FIG. 10B illustrates an example of a log of a microwave oven that is an example of the electrical equipment. The log 1002 of the electrical equipment illustrated in FIG. 10B include, as setting information at the time the electrical equipment is used, the amount of time required for cooking (the field of "Time"), the amount of power required for cooking (the field of "Output power"), and information that indicates whether or not a result of cooking is what a user intended (the field of "Cooking succeed").

The access control unit 123 is capable of performing access control equivalent to the access control according to Embodiment 1, using the product information illustrated in FIG. 10A and the log illustrated in FIG. 10B. More specifically, the access control unit 123 performs the access control such that access to the log of the cooking ingredient for microwave cooking EEE from Company E is allowed and access to the log of the cooking ingredient for microwave cooking EEE from Company F is denied.

(Modification 2 of Embodiment 1)

Modification 2 of this exemplary embodiment will describe access control which is performed when access to a log which is generated when a user uses a rice cooker that is an example of the electrical equipment together with ingredients that is an example of the intended product, is attempted by Company R that is a provider of the ingredient and Company S that is one of the other companies in the same trade as Company R.

Modification 2 of this exemplary embodiment is different from this exemplary embodiment in the format of the product information and the format of the log. The differences will be described in detail.

FIG. 11A is an example of the product information of ingredient RRR that is an example of the intended product. The product information 1101 illustrated in FIG. 11A indicates that the electrical equipment that is used together with the intended product is a rice cooker (the field of "Target equipment"), and the information for identifying the provider of the intended product is Company R (the field of "Provider"). It is to be noted that the product information may further include information for identifying electrical equipment in which the intended product is used.

FIG. 11B illustrates an example of the log of the rice cooker that is an example of the electrical equipment. The log 1002 of the electrical equipment illustrated in FIG. 11B include, as setting information at the time the electrical equipment is used, the type of the rice to be cooked (the field of "Type of rice"), the type of the cooking method (the field of "How to cook"), the amount of water of cooked food (the field of "Amount of water"), and information that indicates whether or not a result of the cooking is what a user intended (the field of "Cooking succeed").

The access control unit 123 is capable of performing access control equivalent to the access control according to Embodiment 1, using the product information illustrated in FIG. 11A and the log illustrated in FIG. 11B. More specifically, the access control unit 123 performs the access control such that access to the log of the ingredient RRR from Company R is allowed and access to the log of the ingredient from Company S is denied.

(Modification 3 of Embodiment 1)

Modification 3 of this exemplary embodiment will describe access control which is performed when access to a log which is generated when a user uses a facial equipment that is an example of the electrical equipment together with a cosmetic that is an example of the intended product, is attempted by a provider of the cosmetic and one of the other companies in the same trade as the provider.

Modification 3 of this exemplary embodiment is different from this exemplary embodiment in the format of the product information and the format of the log. The differences will be described in detail.

The communication terminal receives information on a cosmetic as product information. The facial equipment senses that the cosmetic is used, by a sensor provided on the edge of the facial equipment, and adds tag information to history (log) such as information related to the skin condition of a user that is obtained by different sensing, a setting menu of the facial equipment, and the amount of time of use. It is possible to perform, on the log information generated as described above, the access control equivalent to the access control of Embodiment 1

(Modification 4 of Embodiment 1)

Modification 4 of this exemplary embodiment describes an example of performing access control in which the communication terminal, instead of adding a tag to a log, separately receives a log and a tag and transmits them to a server, and the log and the tag are associated with each other in the server and the access control is performed.

Figure 11C:
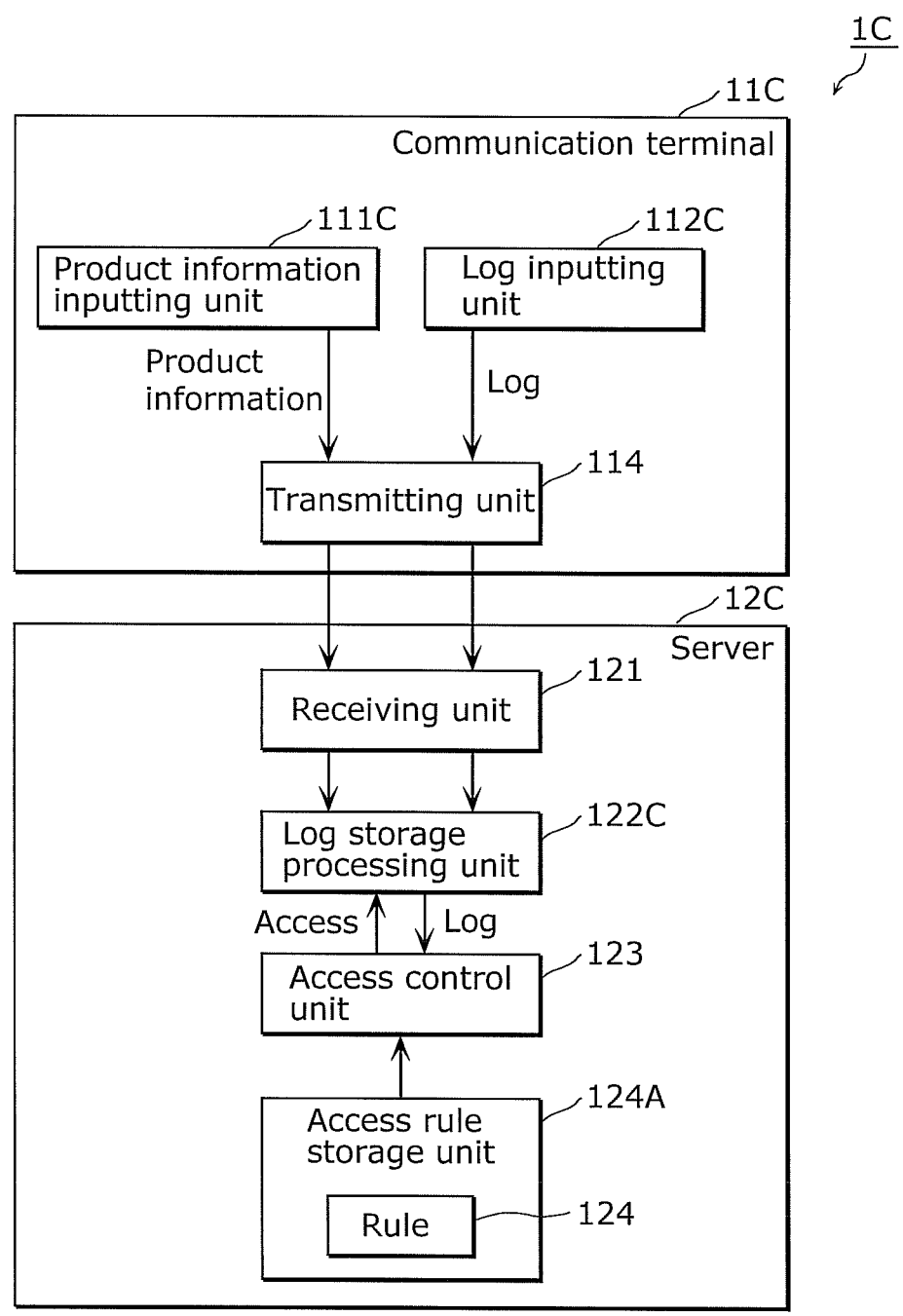
FIG. 11C is a block diagram illustrating an access control system according to Modification 4 of Embodiment 1.

FIG. 11C is a block diagram illustrating an access control system according to Modification 4 of Embodiment 1. The communication terminal 11C according to Modification 4 the includes a product information inputting unit 111C and a log inputting unit 112C in place of the product information inputting unit 111 and the log inputting unit 112, respectively, of the communication terminal 11 according to Embodiment 1. In addition, the server 12C includes a log storage processing unit 122C in place of the tagged log storage processing unit 122.

The product information inputting unit 111C receives product information that is information related to an intended product used together with electrical equipment (not illustrated). Then, the product information inputting unit 111C transmits the product information that has been received to the transmitting unit 114.

The log inputting unit 112C is connected to the electrical equipment (not illustrated) and receives a log that indicates use history of the electrical equipment. Then, the log inputting unit 112C transmits the log that has been received to the transmitting unit 114.

Subsequently, the product information or the log is transmitted to the server 12C by the transmitting unit 114, and then received by the receiving unit 121 of the server 12C. It is to be noted that the product information and the log may be transmitted to the server 12C at the same time or only the product information or only the log may be transmitted to the server 12C.

The log storage processing unit 112C obtains the product information or the log, and stores the obtained product information or the log into the log storage unit (not illustrated). Here, when the log storage processing unit 122C obtains the product information, logs which are received afterwards are treated as logs which are generated when the electrical equipment is used together with a product indicated by the product information. In sum, it is possible to treat the log and the tag in association with each other in the log storage processing unit, using the respective received times.

The access control unit 123 and the access rule storage unit 124A are the same as those in Embodiment 1. Thus, the server 12C is capable of performing the access control for an accessing user who accesses the log that is stored, as with the server 12.

According to the processes as described above, it is possible to implement the access control equivalent to the access control according to Embodiment 1, using the log and the tag which are associated with each other in place of the log to which the tag is added (tagged log) as in Embodiment 1.

It is to be noted that Embodiment 1 can be applied to the electrical equipment and the intended products as below, in addition to the examples of the electrical equipment and the intended product described above.

Electrical equipment: washing machine, Intended product: detergent, laundry

Electrical equipment: microwave oven, Intended product: instant seasoning, cooking ingredient, Microwave oven settings, microwave oven sensor information (temperature, time), comments of user on success or failure, as the log Electrical equipment: facial equipment, Intended product: cosmetics, person (sensor information), Use frequency of the facial equipment, menu, repeat rate of the cosmetics, actual skin condition (sensor), as the log Electrical equipment: shaver, Intended product: cosmetics, person (sensor information)

Electrical equipment: scalp esthetic care, Intended product: cosmetics, person (sensor information)

Electrical equipment: rice cooker, Intended product: rice

Electrical equipment: bread machine, Intended product: ingredient kit

Electrical equipment: body composition scale, Intended product: supplement

[1.7 Advantageous Effect of Embodiment 1]

As described above, it is possible to perform the tag adding process described blow according to this exemplary embodiment. (1) Upon receiving an input of product information, a tag is added to one log of the electrical equipment. (2) Upon receiving an input of product information, the same tag is add to each of the logs of the electrical equipment after the input, the tag to be added is changed after the input of new product information, and the changed tag is add to each of the logs of the electrical equipment. Then, it is possible to properly perform the access control for an accessing user who accesses the tagged log as described above.

As described above, with the access control system according to this exemplary embodiment, use history of an intended product is obtained using use history of electrical equipment that is used together with the intended product. Then, a provider of the intended product is identified from product information which is added to the use history of the intended product, and access control is performed based on an access rule, for an accessing user who attempts to access the use history of the intended product. It is therefore possible to perform proper access control for the information related to the usage when the electrical equipment is used together with the intended product.

With this, in the case of laundry detergent which requires rinse once, for example, the manufacturer of the laundry detergent can obtain information on whether or not a user actually uses the laundry detergent with the required settings. In addition, it is possible to perform access control such that competitive manufacturers cannot refer to the log information generated at the time. It is further possible to give a user an instruction on how to use the detergent or incentives, by combining the log information with other information which identifies the electrical equipment that provides the log information and the user of the electrical equipment.

In addition, the access control is performed based on an access rule prespecified by the provider of the intended product, for an accessing user who attempts to access the use history of the intended product. It is therefore possible to perform proper access control for the information related to the usage when the electrical equipment is used together with the intended product.

In addition, it is possible to perform different access control to each of raw data of the log information and statistical data of the log information. Thus, it is possible to perform access control with finer granularity.

In addition, the communication terminal can receives the product information or the log information using efficient data input means or data transfer means. It is therefore possible for the communication terminal to more efficiently receive information for access control.

In addition, the access control is performed such that the provider of the intended product can access use history of the intended product. It is therefore possible to perform proper access control for the information related to the usage when the electrical equipment is used together with the intended product.

In addition, the access control is performed such that only a specified accessing user can access the use history of the intended product. It is therefore possible to perform proper access control for the information related to the usage when the electrical equipment is used together with the intended product.

In addition, the access control is performed such that only a specified accessing user can access the use history of the intended product. It is therefore possible to perform proper access control for the information related to the usage when the electrical equipment is used together with the intended product.

(Embodiment 2)

In this exemplary embodiment, an example of an access control system will be described in which a tag is added only to a log that satisfies predetermined conditions and this log is used to perform the access control. According to Embodiment 1, it is possible to add a tag to one log (or each log) after inputting the product information. On the other hand, this exemplary embodiment will describe an example of performing access control which, when adding a tag to a log which is generated when a user uses a washing machine that is an example of the electrical equipment together with a laundry detergent that is an example of the intended product, adds a tag only to a log which satisfies a predetermined condition and performs the access control using the log.

It is to be noted that, according to this exemplary embodiment, one communication terminal can be connected to one or more than one electrical equipment.

[2.1 Overall Configuration of Access Control System]

Figure 12A:
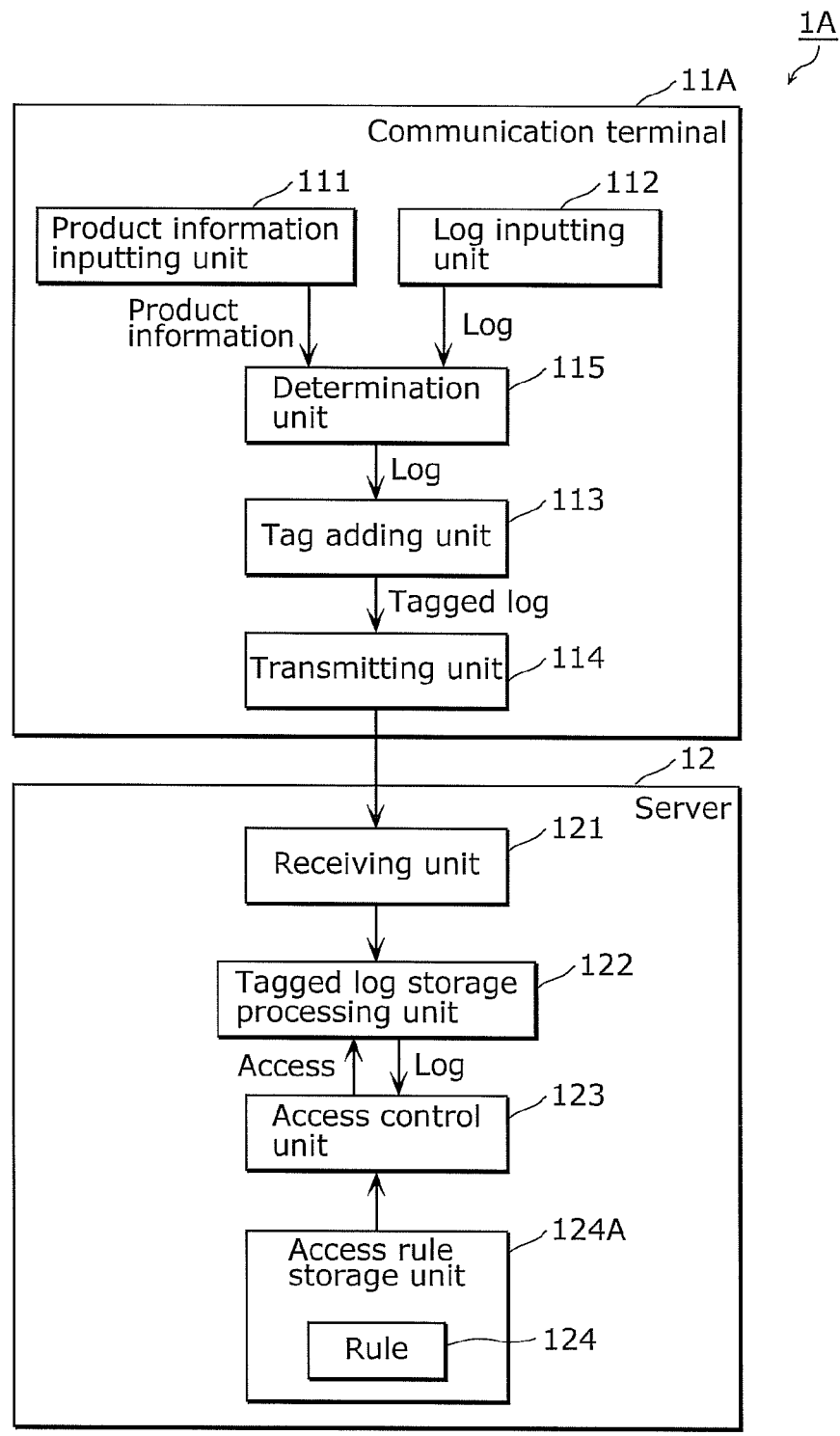
FIG. 12A is a block diagram illustrating an access control system according to Embodiment 2.

FIG. 12A is a block diagram which illustrates an access control system according to this exemplary embodiment.

As illustrated in FIG. 12A, the access control system 1A according to this exemplary embodiment includes a communication terminal 11A and a server 12. The communication terminal 11A includes: a product information inputting unit 111; a log inputting unit 112; a tag adding unit 113; a transmitting unit 114, and a determination unit 115. In addition, the server 12 is equivalent to the server 12 in Embodiment 1.

In this exemplary embodiment, the communication terminal 11A has a configuration different from the configuration of Embodiment 1 in that the determination unit 15 is included.

[2.2 Configuration of Communication Terminal]

[2.2.1 Determination Unit]

The determination unit 115 determines whether or not to add a tag to a received log based on the details of entries of the product information, and adds a tag to a log that is determined that a tag is to be added. Here, the entries of the product information include at least one of: electrical equipment (target equipment); a provider of the product; the number of times a tag is to be added; a name of the product; and an identification number.

[2.3 Processes Performed in the Access Control System]

Figure 12B:
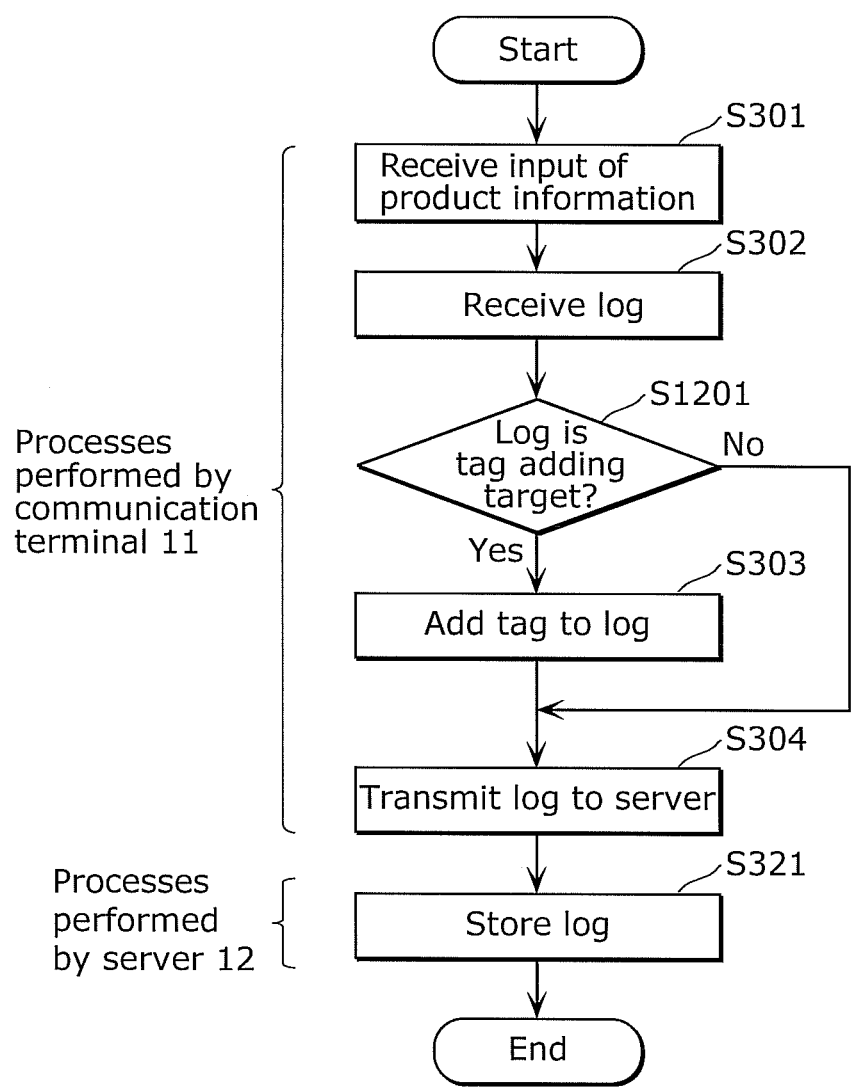
FIG. 12B is a flowchart illustrating access control system according to Embodiment 2.

FIG. 12B is a flowchart which illustrates an access control system according to this exemplary embodiment. The flowchart illustrated in FIG. 12B includes a process of Step S1101 in addition to the flowchart illustrated in FIG. 3. The differences from Embodiment 1 will be described in detail below.

First, the product information inputting unit 111 of the communication terminal 11A receives an input of product information (S301). The process of receiving an input of product information is the same as that of Embodiment 1. According to this exemplary embodiment, the details of the product information are different as below.

Figure 13:
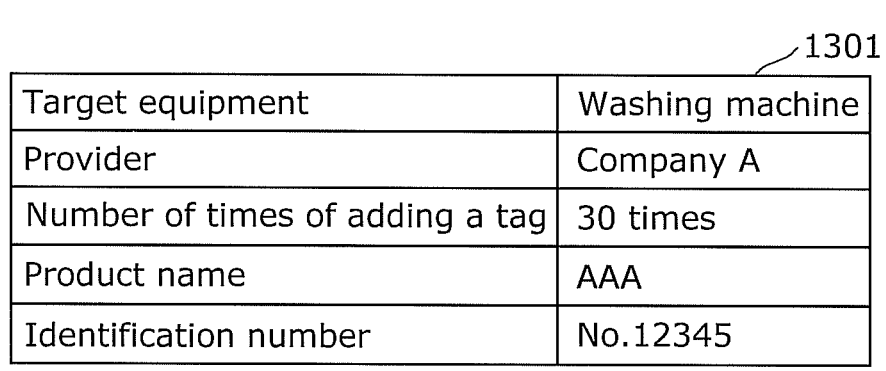
FIG. 13 illustrates an example of product information according to Embodiment 2.

FIG. 13 illustrates an example of product information according to this exemplary embodiment. The product information 1301 illustrated in FIG. 13 includes: the number of times of a tag is to be added (the field of "tag adding count"); the name of the laundry detergent (the field of "product name"); and the identification number of the laundry detergent (the field of "unique number"), in addition to the electrical equipment that is used together with the intended product (the field of "target equipment") and the information for identifying the provider of the intended product (the field of "provider"). As specific examples of a laundry detergent AAA, the number of times a tag is to be added is 30 times, the name of the laundry detergent is "AAA", and the identification number of the laundry detergent is "No. 12345".

Next, the log inputting unit 112 of the communication terminal 11A receives a log of the electrical equipment (S302). The process of receiving a log of the electrical equipment is the same as that of Embodiment 1.

Next, the determination unit 115 of the communication terminal 11A determines whether or not the log received in S302 is the target to which a tag is to be added (S1201). More specifically, a tag is to be added in the case where the details of each entry of the product information are the same as the details of each entry of the information of the intended product. The following will describe in detail.

(1) Determination of the Target Equipment

The case is assumed in which, when the communication terminal 11 communicates with the electrical equipment, the communication terminal 11 can recognize a category (type) of the electrical equipment. In this case, whether or not the category of the electrical equipment which is detected by the communication terminal 11 is identical to the category of the target equipment indicated in the product information 1301 is determined. Then, a tag is added to the log that is determined that the category is identical.

(2) Determination of the Provider

The case is assumed in which the log of the electrical equipment which is obtained by the communication terminal 11 includes information for identifying the provider of the intended product that is used together with the electrical equipment. In this case, whether or not the information for identifying the provider, which is included in the log of the electrical equipment, is identical to the details of "Provider" indicated in the product information 1301 is determined. Then, a tag is added to the log that is determined that the information is identical.

It is to be noted that a variety of ways can be employed for including the information for identifying the provider of the intended product that is used together with the electrical equipment. For example, there is a method that the communication terminal 11 registers the information on the electrical equipment in advance. In addition, when the electrical equipment is the washing machine, there is a method that the washing machine analyzes the component of the laundry detergent and identifies the provider, thereby generating the information.

(3) Determination of the Number of Times a Tag is to be Added

The case is assumed in which the tag adding unit 113 performs counting to determine where the log received from the electrical equipment is in the order starting from the receiving of the product information 1301. In this case, whether or not the number of the counting of the product information 1301 after receiving the product information 1301 is smaller than "Tag adding count" indicated in the product information 1301 is determined. Then, a tag is added to the log that is determined that the number is identical.

It is to be noted that a remaining amount of the detergent may be calculated from the amount of the detergent at the time of starting of use and the amount of detergent that has been used, and the tag adding unit 113 may add a tag to the log when the remaining amount of the detergent is larger than 0. For example, in the case where the amount of the detergent at the time of starting of use is 900 ml and 30 ml are used per one washing, the remaining amount of the detergent after using once is 870 ml, the remaining amount of the detergent after using twice is 840 ml, and the remaining amount of the detergent after using 30 times is 0 ml. In sum, the tag adding unit 113 adds a tag to the logs which are generated from 30 times of use.

It is to be noted that, when an expiration date is specified on the intended product, the tag adding unit 113 may avoid adding a tag to the log generated when the intended product is used after the expiration date.

(4) Determination of the Name of the Product

The case is assumed in which the log of the electrical equipment obtained by the communication terminal 11 includes the product name of the intended product that is used together with the electrical equipment. In this case, whether or not the product name included in the log of the electrical equipment is identical to the details of "Product name" indicated in the product information 1301 is determined. Then, a tag is added to the log that is determined that the product name is identical.

It is to be noted that a variety of ways can be employed for including the product name of the intended product that is used together with the electrical equipment. For example, there is a method that the communication terminal 11 registers the product name on the electrical equipment in advance. In addition, there is a method that the electrical equipment analyzes the components of the laundry detergent and identifies the product name.

(5) Determination of the Identification Number

The case is assumed in which the log of the electrical equipment obtained by the communication terminal 11 includes the identification number of the intended product that is used together with the electrical equipment. In this case, whether or not the identification number included in the log of the electrical equipment is identical to the details of "Unique number" indicated in the product information 1301 is determined. Then, a tag is added to the log that is determined that the identification number is identical.

It is to be noted that a variety of ways can be employed for including the identification number of the intended product that is used together with the electrical equipment. For example, there is a method that the communication terminal 11 registers the identification number on the electrical equipment in advance.

The methods performed by the determination unit 115 to determine whether or not a log is the target log to which a tag is to be added have been described above. It is to be noted that only one of the above-described methods of (1) to (5) may be used, a plurality of the methods may be combined, or all of them may be used.

A tag is added to the log (S303) which is determined as the target to which a tag is to be added according to the above-described determination (Yes in S1201).

Processes after a tag is added to the log are the same as those in Embodiment 1, and thus detailed description will be omitted.

[2.4 Advantageous Effect of Embodiment 2]

According to the processes as described above, the communication terminal 11 can add a proper tag to each of the logs even when a plurality of the intended products are used in a plurality of the electrical equipment items. As a result, it is possible to perform proper access control on a log.

As described above, with the access control system according to this exemplary embodiment, the communication terminal is capable of adding a tag only to a log of the electrical equipment that is specified by the product information. The communication terminal, even when many types of electrical equipment items are connected to the communication terminal, is capable of adding a tag which corresponds to the intended product that is used in a corresponding one of the electrical equipment items. As a result, it is possible to perform proper access control for an accessing user who accesses the log of the electrical equipment. Therefore, it is possible to perform proper access control even when many types of electrical equipment items are connected.

In addition, the communication terminal is capable of adding a tag only to a log of a provider of the intended product that is specified by the product information. The communication terminal, even when many types of electrical equipment items are connected to the communication terminal, is capable of adding a tag which corresponds to an intended product used in a corresponding one of the electrical equipment items. As a result, it is possible to perform proper access control for an accessing user who accesses the log of the electrical equipment. Therefore, it is possible to perform proper access control even when many types of electrical equipment items are connected.

In addition, it is possible to not only adding a tag for a single log information item for a single input of the product information but also adding a tag for the specified number of log information items that is specified as the number of times. It is therefore possible to efficiently perform a tag adding process for the access control.

In addition, when the communication terminal receives product information including a name of the intended product and further receives log information of the electrical equipment which includes the name of the intended product, it is possible to add a tag to the log information of which the name of the intended product is identical. It is therefore possible to more accurately perform a tag adding process for the access control.

In addition, when the communication terminal receives product information including an identification number of the intended product and further receives log information of the electrical equipment which includes the identification number of the intended product, it is possible to add a tag to the log information of which the identification number of the intended product is identical. It is therefore possible to more accurately perform a tag adding process for the access control.

In addition, by employing the log information including only a specific unique number, it is possible to perform access control with a limited number of monitors, for example, access control on the settings and the log of a washing machine when a predetermined laundry detergent is used with 100 target monitors.

In addition, it is possible, after inputting one product information item, to automatically determine, from the amount of the product information or the like, the period of time in which a product corresponding to the product information is used and add a tag only to a log in the period of time. Thus, it is not necessary to input product information every time the product is used. In addition, in the case where a user becomes a usage monitor of the product so as to obtain incentives when the user provides use history of the product, it is also possible to add a tag only to the log in the period of time in which the user is the usage monitor.

(Embodiment 3)

In Embodiment 1 and Embodiment 2, the communication terminal receives setting information at the time when the electrical equipment is used from the electrical equipment. In this exemplary embodiment, an example will be described in which a user creates setting information of the electrical equipment on the communication terminal and the communication terminal outputs the setting information to the electrical equipment, thereby setting the electrical equipment.

[3.1 Overall Configuration of the Access Control System]

Figure 14:
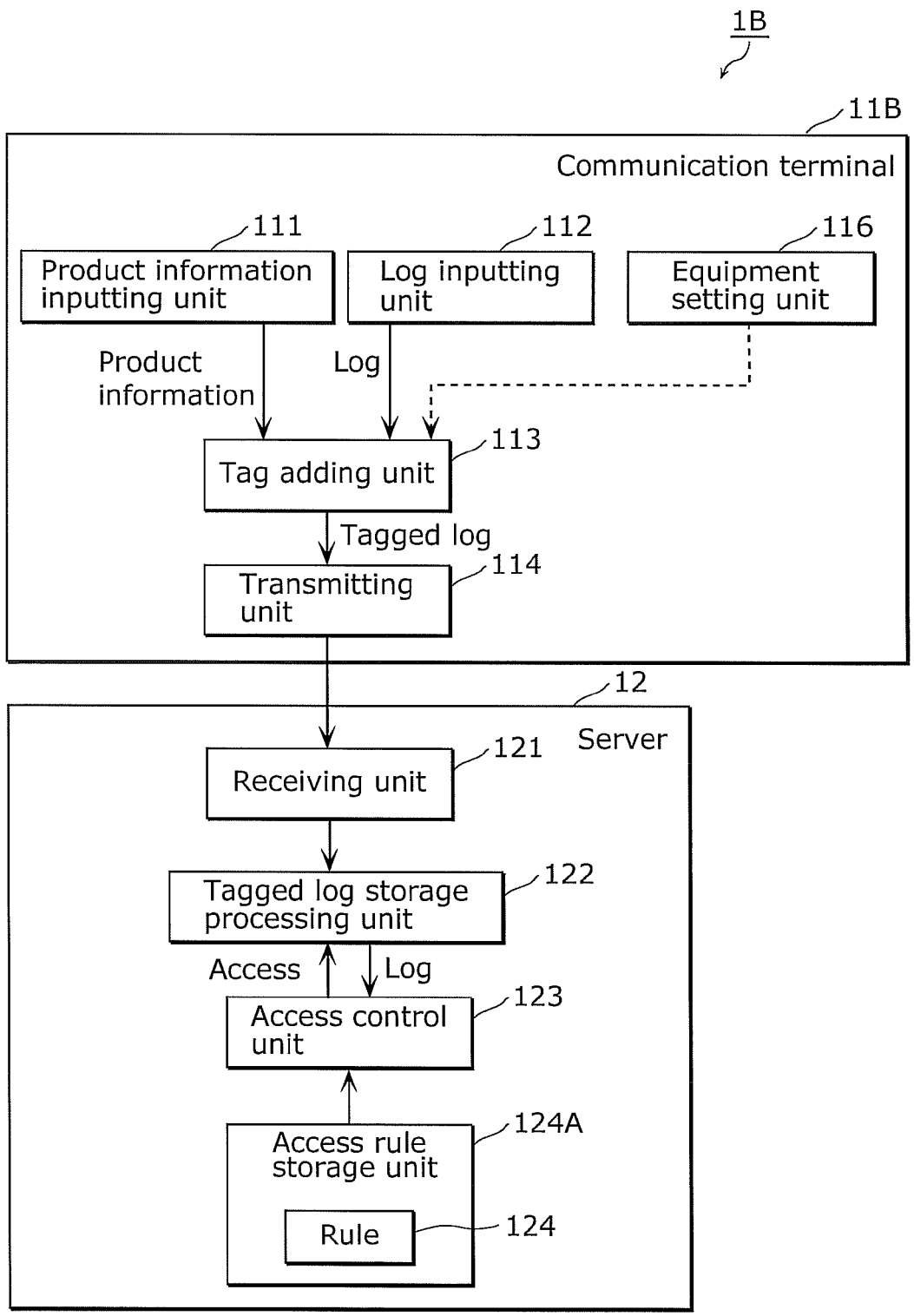
FIG. 14 is a block diagram illustrating an access control system according to Embodiment 3.

FIG. 14 is a block diagram which illustrates an access control system 1B according to this exemplary embodiment. As illustrated in FIG. 14, the access control system 1B includes a communication terminal 11B and a server 12. Then, the communication terminal 11B includes: a product information inputting unit 111; a log inputting unit 112; a tag adding unit 113; a transmitting unit 114; and an equipment setting unit 116. In addition, the server 12 is equivalent to the server 12 in Embodiment 1.

In this exemplary embodiment, the communication terminal 11B has a configuration different from the configuration of Embodiment 1 in that the equipment setting unit 116 is included.

[3.2 Configuration of the Communication Terminal]

[3.2.1 Equipment Setting Unit]

The equipment setting unit 116 creates setting information of electrical equipment and outputs the setting information to the electrical equipment. In creating the setting information of the electrical equipment, a Web site or a software may be used which are provided for creating setting information of the electrical equipment. Output to the electrical equipment can be implemented by radio communication, for example.

[3.3 Processes Performed in the Access Control System]

Figure 15:
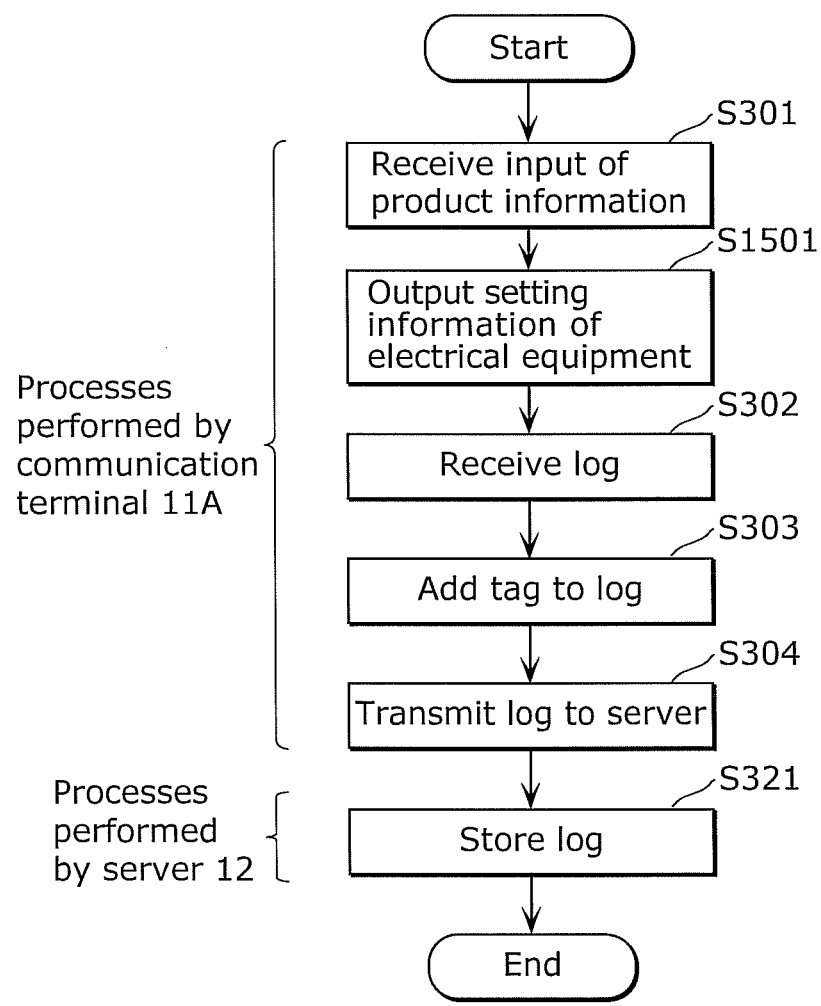
FIG. 15 is a flowchart illustrating an access control system according to Embodiment 3.

FIG. 15 is a flowchart which illustrates an access control system according to this exemplary embodiment. The flowchart illustrated in FIG. 15 includes a process of Step S1501 in addition to the flowchart illustrated in FIG. 3. The differences from Embodiment 1 will be described in detail below.

The communication terminal 11 creates setting information of electrical equipment and outputs the setting information to the electrical equipment (S1501). First, a user operates the communication terminal 11 to create the setting information of the electrical equipment on the communication terminal 11. It is to be noted that, in order to create the setting information of the electrical equipment, a Web site or software may be used which are provided for creating the setting information of the electrical equipment. Next, the created setting information is outputted to the electrical equipment. As the communication method at the time of outputting, the communication method that is equivalent to the communication method used at the time of receiving a log may be used.

The setting information created in S1501 is reflected in the log of the electrical equipment, and inputted to the communication terminal 11 in the log inputting process (S302). It is to be noted that the setting information of the electrical equipment created by the equipment setting unit 116 may be outputted to the tag adding unit 113 as a part of a log. With this, it is possible to reduce the amount of information received as a log from the electrical equipment.

Description of the processes other than the process of S1501 will be omitted because they are the same as the processes in Embodiment 1.

[3.4 Advantageous Effect of Embodiment 3]

As described above, with the access control system according to this exemplary embodiment, a user can create setting information of the electrical equipment on the communication terminal on which generally a more abounding user interface is mounted than the electrical equipment, and can perform settings of the electrical equipment by providing the setting information to the electrical equipment. The user creates the setting information of the electrical equipment on the communication terminal, and thus it is possible to perform detailed setting more accurately at higher speed compared to the case of performing the settings on the electrical equipment. As a result, useful log information can be obtained for the provider of the intended product.

In addition, it is also possible that the tag adding unit 113 is present in the server 12. More specifically, it is also possible that the transmitting unit 114 transmits, to the server, the product information received by the product information inputting unit 111 and the log received by the log inputting unit 112, and the tag adding unit 113 in the server adds a tag to the log. At this time, in the case where the electrical equipment is a washing machine, for example, when the log received by the log inputting unit 112 includes the components of the detergent, the transmitting unit 114 may transmit the log including the components of the detergent to the server, and the provider may be identified from the components of the detergent in the server 12. This allows the server 12 to perform a complicated process such as analyzing the components of the detergent, and thus it is possible to reduce the processing load of the communication terminal 11. In addition, the product information and the log transmitted by the transmitting unit 114 to the server may be, instead of a specific character string or a numerical value such as the product information 501 (FIG. 5A) and the log 502 (FIG. 5B), IDs which indicates them. In this case, after the server 12 performs conversing processes from the IDs to a specific character string or a numerical value, subsequent processes such as the process performed by the tagged log storage processing unit 122.

(Other Modifications)

It is to be noted that although the present disclosure has been described based on the above-described exemplary embodiments, it should be understood that the present disclosure is not limited to the above-described exemplary embodiments. The cases described below are also included in the present disclosure.

(1) A part or all of the constituent elements constituting the respective apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the RAM. The System-LSI achieves its function through the microprocessor's operation according to the computer program.

Furthermore, each unit of the constituent elements configuring the respective apparatuses may be made as separate individual chips, or as a single chip to include a part or all thereof.

In addition, the name used here is system LSI, but it may also be called IC, LSI, super LSI, or ultra LSI depending on the degree of integration. Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

(2) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and so on. The IC card or the module may also be included in the aforementioned super-multi-function LSI. The IC card or the module achieves its function through the microprocessor's operation according to the computer program. The IC card or the module may also be implemented to be tamper-resistant.

(3) The present disclosure may also be realized as a method described above. In addition, the present disclosure may be a computer program for realizing the previously illustrated methods using a computer, and may also be a digital signal including the computer program.

Furthermore, the present invention may also be realized by storing the computer program or the digital signal in a non-transitory computer readable recording medium such as flexible disc, a hard disk, a CD-ROM, an MO, a DVD, a DVD-ROM, a DVD-RAM, a BD (Blu-ray Disc), and a semiconductor memory. Furthermore, the present invention may also include the digital signal recorded in these recording media.

In addition, the present disclosure may also be realized by the transmission of the aforementioned computer program or digital signal via a telecommunication line, a wireless or wired communication line, a network represented by the Internet, a data broadcast and so on.

The present disclosure may also be a computer system including a microprocessor and a memory, in which the memory stores the aforementioned computer program and the microprocessor operates according to the computer program.

In addition, by transferring the program or the digital signal by recording onto the aforementioned non-transitory recording media, or by transferring the program or digital signal via the aforementioned network and the like, execution using another independent computer system is also made possible.

(4) In addition, each of the above-mentioned embodiments and modifications may be combined with each other.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the access control system according to each of the embodiments is a program described below.

That is, the program causes a computer to execute an access control method which is performed in an access control system including a communication terminal and a server and which includes: receiving a log information item indicating use history of electrical equipment that is used together with an intended product, which is performed by the communication terminal; receiving product information including information for identifying the intended product, which is performed by the communication terminal; adding tag information indicating the product information to the log information item received in the receiving of a log information item, which is performed by the communication terminal; transmitting a tagged log information item, to the server, which results from the addition of the tag information to the log information item in the adding of tag information, which is performed by the communication terminal; receiving the tagged log information item transmitted in the transmitting, which is performed by the server; storing the tagged log information item received in the receiving; storing an access rule for accessing the tagged log information item stored in the storing of the tagged log information item, which is performed by the server; and controlling whether or not to allow access to the tagged log information item by referring to the tag information and the access rule of the tagged log information item.

In addition, the program causes a computer to execute a communication method which is performed by a communication terminal which transmits a log information item to a server and which includes: receiving a log information item indicating use history of electrical equipment that is used together with an intended product; receiving product information including information for identifying the intended product; adding tag information indicating the product information to the log information item received in the receiving of a log information item, and transmitting tagged log information item which results from the addition of the tag information to the log information item in the adding of tag information, to the server which controls whether or not to allow access to the tagged log information item by an accessing user.

In addition, the program causes a computer to execute an access control method including: receiving a log information item indicating use history of electrical equipment that is used together with an intended product; receiving product information including information for identifying the intended product; storing the log information item and the product information in association with each other, the log information item being received in the receiving of a log information item, the product information being received in the receiving of product information; and controlling whether or not to allow access to the log information item based on the product information associated with the log information item when access to the log information item is attempted.

In addition, the program causes a computer to execute an access control method performed by a communication terminal in an access control system including: the communication terminal that transmits a log information item indicating use history of electrical equipment used together with an intended product; and a server that controls whether or not to allow access to the log information item based on product information associated with the log information item transmitted by the communication terminal, the access control method including: receiving the log information item indicating the use history of the electrical equipment that is used together with the intended product; receiving the product information including information for identifying the intended product; and transmitting the received log information item and the received product information to the server.

It should be noted that although the access control system according to one or more aspects is described based on the aforementioned exemplary embodiments, the present invention is obviously not limited to such exemplary embodiments. Other forms in which various modifications apparent to those skilled in the art are applied to the embodiments, or forms structured by combining structural elements of different embodiments may be included within the scope of the plurality of aspects, unless such changes and modifications depart from the scope of the present disclosure.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

According to the present disclosure, it is possible to perform proper access control for the information related to the usage when the electrical equipment is used together with the intended product.

The invention claimed is:

1. An access control method comprising:
   receiving, via a wired connection or a wireless connection with electrical equipment, a log information item indicating use history of the electrical equipment that is used together with an intended product;
   receiving, via input of a product code of the intended product, product information including information for identifying the intended product used together with the electrical equipment at a time of use of the electrical equipment according to the use history indicated by the log information item received in the receiving of the log information item;
   storing the log information item and the product information in association with each other, the log information item being received in the receiving of the log information item, and the product information being received in the receiving of the product information;
   determining, when access to the log information item indicating the use history of the electrical equipment used together with the intended product is attempted by an accessing user, whether or not to allow the access to the accessing user to the log information item based on (i) the product information stored in the storing in the association with the log information item to which the access has been attempted by the accessing user, and (ii) a relationship between the accessing user and a provider of the intended product; and
   performing control to allow the access to the accessing user when the access has been determined to be allowed in the determining, and not to allow the access to the accessing user when the access has been determined not to be allowed in the determining,
   wherein the relationship between the accessing user and the provider of the intended product is prespecified by the provider of the intended product.

2. The access control method according to claim 1, further comprising
   adding tag information indicating the product information to the log information item received in the receiving of the log information item,
   wherein in the storing,
   a tagged log information item is stored which results from the addition of the tag information to the log information item in the adding of tag information, and
   in the determining,
   whether or not to allow the access to the tagged log information item is determined based on the tag information included in the tagged log information item.

3. The access control method according to claim 2,
   wherein in the determining,
   whether or not to allow the access is determined by referring to a rule which specifies whether or not to allow the access to the accessing user who attempts to access the log information item stored in the storing, based on a relationship between the accessing user and the provider of the intended product identified by the tag information added to the log information item.

4. The access control method according to claim 2,
   wherein in the receiving of the log information item,
   the log information item is received which includes first equipment information indicating a type of the electrical equipment which is used,
   in the receiving of the product information,
   second equipment information is further received as the product information, the second equipment information indicating a type of the electrical equipment that is used together with the intended product, and
   in the adding of the tag information,
   the tag information is added to the log information item when the log information item includes the first equipment information which is identical to the second equipment information.

5. The access control method according to claim 2,
   wherein in the receiving of the log information item,
   the log information item is received which includes first provider information for identifying the provider of the intended product that is used when the electrical equipment is used,
   in the receiving of the product information,
   second provider information for identifying the provider of the intended product is further received as the product information, and
   in the adding of the tag information,
   the tag information is added to the log information item when the log information item includes the first provider information which identifies the provider who is identical to the provider identified by the second provider information.

6. The access control method according to claim 2,
   wherein in the receiving of the product information,
   a number of times the tag information is to be added in the adding of the tag information is further received as the product information, and
   in the adding of the tag information,
   after receiving, in the receiving of the product information, the product information including the number of times the tag information is to be added, the tag information is added to a plurality of the log information item identical in number to the number the tag information is to be added.

7. The access control method according to claim 2,
   wherein in the receiving of the log information item,
   the log information item including a name of the intended product is received,
   in the receiving of the product information,
   a name of the intended product is further received as the product information, and
   in the adding of the tag information,
   the tag information is added to the log information item received in the receiving of the log information item when the log information item includes the name of the intended product which is identical to the name of the intended product received in the receiving of the product information.

8. The access control method according to claim 2,
   wherein in the receiving of the log information item,
   the log information including an identification number of the intended product is received,
   in the receiving of the product information,
   an identification number of the intended product is further received as the product information, and in the adding of the tag information,
the tag information is added to the log information item received in the receiving of the log information item when the log information item includes the identification number which is identical to the identification number received in the receiving of the product information.

9. The access control method according to claim 2,
wherein in the storing,
the log information item and a statistical log information item are stored as first log information items, the statistical log information item being generated by performing statistical processing on a plurality of the log information item,
wherein in the determining,
whether or not to allow the access to each of the log information item and the statistical log information item is determined by referring to a rule which specifies whether or not to allow the access by the accessing user who attempts to access the log information item and the statistical log information item.

10. The access control method according to claim 2,
wherein in the receiving of the product information via the input of the product code of the intended product, the product information is received by reading a quick response (QR) code attached to the intended product, and
in the receiving of the log information item via the wireless connection,
the log information item is received via a near field communication (NFC) with the electrical equipment.

11. The access control method according to claim 2, further comprising
generating setting information of the electrical equipment and outputting the setting information to the electrical equipment,
wherein in the receiving of the log information item,
the log information item is received which indicates the use history of the electrical equipment to which the setting information is outputted in the generating.

12. The access control method according to claim 2,
wherein in the determining,
whether or not to allow the access is determined by referring to a rule including a first rule that allows the access to the log information item by the accessing user who attempts to access the log information item, when the accessing user is identical to the provider of the intended product indicated by the tag information.

13. The access control method according to claim 2,
wherein in the determining based on the relationship between the accessing user and the provider of the intended product,
whether or not to allow the access is determined by referring to a rule including a second rule that allows the access to the log information item by the accessing user who attempts to access the log information item, when the accessing user is included in a user group prespecified by the provider of the intended product.

14. The access control method according to claim 2,
wherein in the determining,
whether or not to allow the access is determined by referring to a rule including a third rule that denies the access to the log information item by the accessing user who attempts to access the log information item, when the accessing user is included in a user group prespecified by the provider of the intended product.

15. An access control system comprising a communication terminal and a server,
wherein the communication terminal includes:
a log inputting unit configured to receive, via a wired connection or a wireless connection with electrical equipment, a log information item indicating use history of the electrical equipment that is used together with an intended product;
a product information inputting unit configured to receive, via input of a product code of the intended product, product information including information for identifying the intended product used together with the electrical equipment at a time of use of the electrical equipment according to the use history indicated by the log information item received in the receiving of the log information item; and
a transmitting unit configured to transmit, to the server, the log information item received by the log inputting unit and the product information received by the product information inputting unit, and
the server includes:
a receiving unit configured to receive the log information item and the product information from the communication terminal;
a log storage processing unit configured to store the log information item and the product information in association with each other, the log information item and the product information being received by the receiving unit; and
an access determining unit configured to, when access to the log information item indicating the use history of the electrical equipment used together with the intended product is attempted by an accessing user:
determine whether or not to allow the access to the accessing user to the log information item based on (i) the product information stored in the log storage processing unit in the association with the log information item to which the access has been attempted by the accessing user, and (ii) a relationship between the accessing user and a provider of the intended product; and
perform control to allow the access to the accessing user when the access has been determined by the access determining unit to be allowed, and not to allow the access to the accessing user when the access has been determined by the access determining unit not to be allowed,
wherein the relationship between the accessing user and the provider of the intended product is prespecified by the provider of the intended product.

16. An access control method performed by a communication terminal in an access control system including: the communication terminal that transmits a log information item indicating use history of electrical equipment used together with an intended product; and a server that, when access to the log information item indicating the use history of the electrical equipment used together with the intended product is attempted by an accessing user, determines whether or not to allow the access to the accessing user to the log information item based on (i) product information including information for identifying the intended product, the product information associated with the log information item to which the access has been attempted by the accessing user and transmitted by the communication terminal, and (ii) a relationship between the accessing user and a provider of the intended product, and performs control to allow the access to the accessing user when the access has been determined to be allowed by the server, and not to allow the access to the accessing user when the access to the accessing user when the access has been determined by the server not to be allowed, wherein the relationship between the accessing user and the provider of the intended product is pre-specified by the provider of the intended product, the access control method comprising:

receiving, via a wired connection or a wireless connection with the electrical equipment, the log information item indicating the use history of the electrical equipment that is used together with the intended product;

receiving, via input of a product code of the intended product, the product information used together with the electrical equipment at a time of use of the electrical equipment according to the use history indicated by the log information item received in the receiving of the log information item; and transmitting the received log information item and the received product information to the server.

\* \* \* \* \*